US012634739B2

(12) United States Patent
Hwang et al.

(10) Patent No.: US 12,634,739 B2
(45) Date of Patent: May 19, 2026

(54) CONFIGURATION OF MEASUREMENT GAP

(71) Applicant: LG ELECTRONICS INC., Seoul (KR)

(72) Inventors: Jinyup Hwang, Seoul (KR); Yoonoh Yang, Seoul (KR); Sangwook Lee, Seoul (KR); Suhwan Lim, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 318 days.

(21) Appl. No.: 18/576,303

(22) PCT Filed: Jul. 5, 2022

(86) PCT No.: PCT/KR2022/009674
§ 371 (c)(1),
(2) Date: Jan. 3, 2024

(87) PCT Pub. No.: WO2023/282582
PCT Pub. Date: Jan. 12, 2023

(65) Prior Publication Data
US 2024/0349101 A1     Oct. 17, 2024

(30) Foreign Application Priority Data

Jul. 6, 2021     (KR) ......................... 10-2021-0088243
Nov. 25, 2021     (KR) ......................... 10-2021-0164729

(51) Int. Cl.
*H04W 24/10*          (2009.01)
(52) U.S. Cl.
CPC .................................. *H04W 24/10* (2013.01)

(58) Field of Classification Search
CPC ...................................................... H04W 24/10
(Continued)

(56) References Cited

U.S. PATENT DOCUMENTS

2016/0227505 A1     8/2016  Loehr et al.
2019/0313272 A1     10/2019  Zhou et al.
(Continued)

FOREIGN PATENT DOCUMENTS

WO          2021-037645          3/2021

OTHER PUBLICATIONS

European Patent Office Application Serial No. 22837934.3, Search Report dated Apr. 4, 2025, 15 pages.
(Continued)

*Primary Examiner* — Chi Tang P Cheng
(74) *Attorney, Agent, or Firm* — LEE, HONG, DEGERMAN, KANG & WAIMEY

(57) ABSTRACT

A disclosure of this specification provides a method for radio communication, performed by user equipment (UE), comprising: establishing a dual connectivity (DC) with both a primary cell (PCell) and a primary secondary cell (PSCell); determining i) a first propagation delay of a first non-terrestrial network (NTN) satellite for the PSCell, ii) a second propagation delay of a second NTN satellite for a target cell and iii) a third propagation delay of a third NTN satellite for the PCell; transmitting, to PCell, a timing offset for the PSCell based on i) the first propagation delay, ii) the second propagation delay and iii) the third propagation delay; receiving, from the PCell, a first MG (measurement gap) for the PCell and a second MG for the PSCell, wherein the second MG configuration is based on the timing offset.

9 Claims, 27 Drawing Sheets

1

(58) Field of Classification Search
USPC .......................................................... 370/252
See application file for complete search history.

(56) References Cited

U.S. PATENT DOCUMENTS

| | | |
|---|---|---|
| 2020/0053807 A1 | 2/2020 | Yang et al. |
| 2021/0029658 A1 | 1/2021 | Mahalingam et al. |
| 2023/0180174 A1* | 6/2023 | Yerramalli .......... H04W 72/231 |
| | | 455/456.3 |
| 2023/0283361 A1* | 9/2023 | Fan .................... H04B 7/18519 |

OTHER PUBLICATIONS

PCT International Application No. PCT/KR2022/009674, International Search Report dated Oct. 7, 2022, 3 pages.
Apple, "Considerations for RA Type and TA Timer MAC Enhancements in Non Terrestrial Networks," R2-2103839, 3GPP TSG RAN WG2 #113bis-e, e-Meeting, Apr. 2021, 7 pages.
Eutelsat et al., "TP for TR 36.763 capturing RAN2 #114e agreements," R2-2106745, 3GPP TSG RAN WG2 Meeting #114-e, May 2021, 30 pages.

* cited by examiner

FIG. 1

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 8

SS block(=SS+PBCH)

SS burst   SS burst   SS burst   SS burst   SS burst   SS burst 1,2        3,4        5,6

SS burst set period 1,2        3,4        5,6 time

→ : Interruption due to PCell RF retuning

⇢ : Interruption due to PSCell RF retuning

FIG. 22

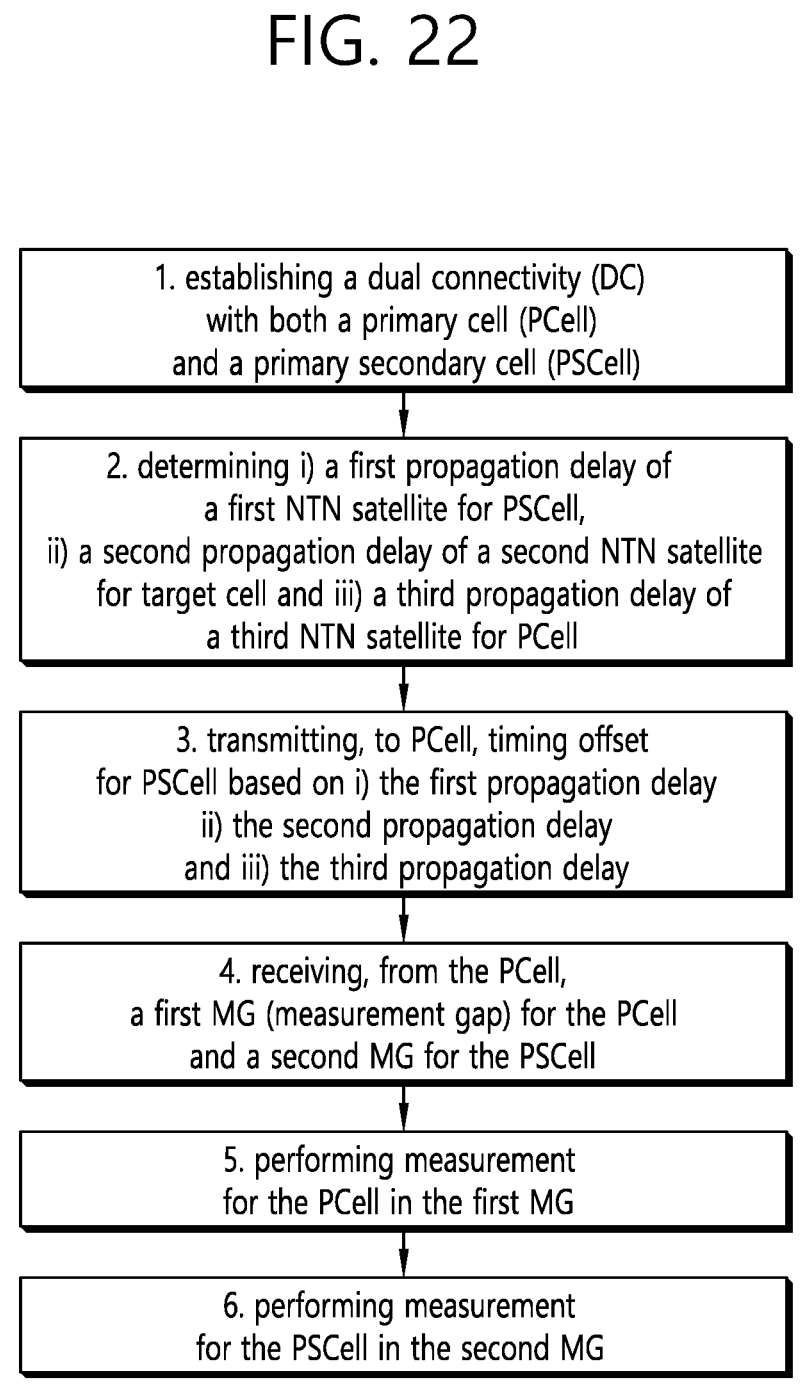

1. establishing a dual connectivity (DC)
with both a primary cell (PCell)
and a primary secondary cell (PSCell)

2. determining i) a first propagation delay of
a first NTN satellite for PSCell,
ii) a second propagation delay of a second NTN satellite
for target cell and iii) a third propagation delay of
a third NTN satellite for PCell 3. transmitting, to PCell, timing offset
for PSCell based on i) the first propagation delay
ii) the second propagation delay
and iii) the third propagation delay 4. receiving, from the PCell,
a first MG (measurement gap) for the PCell
and a second MG for the PSCell 5. performing measurement
for the PCell in the first MG 6. performing measurement
for the PSCell in the second MG

FIG. 23

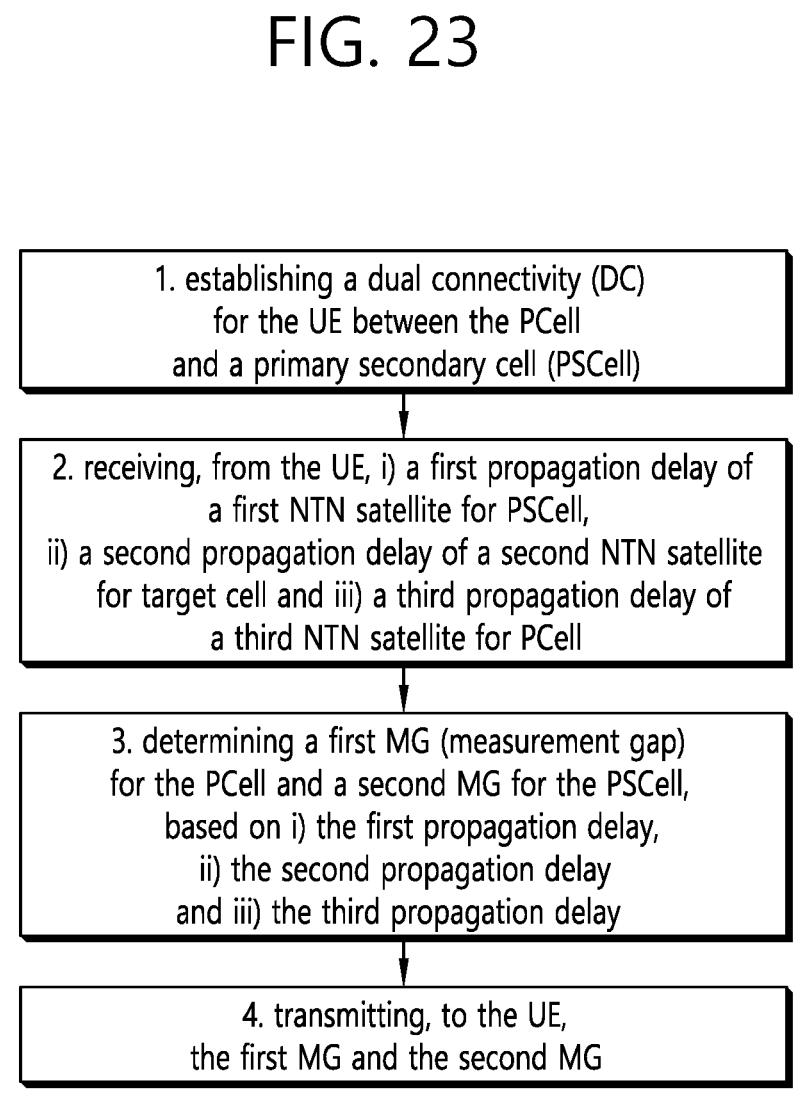

1. establishing a dual connectivity (DC)
for the UE between the PCell
and a primary secondary cell (PSCell)

2. receiving, from the UE, i) a first propagation delay of
a first NTN satellite for PSCell,
ii) a second propagation delay of a second NTN satellite
for target cell and iii) a third propagation delay of
a third NTN satellite for PCell 3. determining a first MG (measurement gap)
for the PCell and a second MG for the PSCell,
based on i) the first propagation delay,
ii) the second propagation delay
and iii) the third propagation delay 4. transmitting, to the UE,
the first MG and the second MG

CONFIGURATION OF MEASUREMENT GAP

CROSS-REFERENCE TO RELATED APPLICATIONS

This application is the National Stage filing under 35 U.S.C. 371 of International Application No. PCT/KR2022/009674, filed on Jul. 5, 2022, which claims the benefit of earlier filing date and right of priority to Korean Application Nos. 10-2021-0088243, filed on Jul. 6, 2021, and 10-2021-0164729, filed on Nov. 25, 2021, the contents of which are all hereby incorporated by reference herein in their entireties.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

In NTN, when UE is connected to network with dual connectivity, since the difference in propagation delay for the UE in the PCell and the PSCell is large, MG configuration is required in consideration of the difference in propagation delay.

In accordance with an embodiment of the present disclosure, a disclosure of this specification provides a method for radio communication, performed by user equipment (UE), comprising: establishing a dual connectivity (DC) with both a primary cell (PCell) and a primary secondary cell (PS-Cell): determining i) a first propagation delay of a first non-terrestrial network (NTN) satellite for the PSCell, ii) a second propagation delay of a second NTN satellite for a target cell and iii) a third propagation delay of a third NTN satellite for the PCell: transmitting, to PCell, a timing offset for the PSCell based on i) the first propagation delay, ii) the second propagation delay and iii) the third propagation delay: receiving, from the PCell, a first MG (measurement gap) for the PCell and a second MG for the PSCell, wherein the second MG configuration is based on the timing offset: performing measurement for the PCell in the first MG; and performing measurement for the PSCell in the second MG.

The present disclosure can have various advantageous effects.

For example, by configuring MG based on propagation delay, measurement is performed more efficiently.

Advantageous effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 8 shows a diagram illustrating an example of beam sweeping in the NR.

FIG. 9 shows an example of performing measurement in E-UTRAN and NR (EN) DC case.

FIG. 10 shows an example of performing measurement in NR carrier aggregation case.

FIG. 22 shows a procedure of UE according to an embodiment of the present disclosure.

FIG. 23 shows a procedure of base station according to an embodiment of the present disclosure.

DETAILED DESCRIPTION

Figure 2:
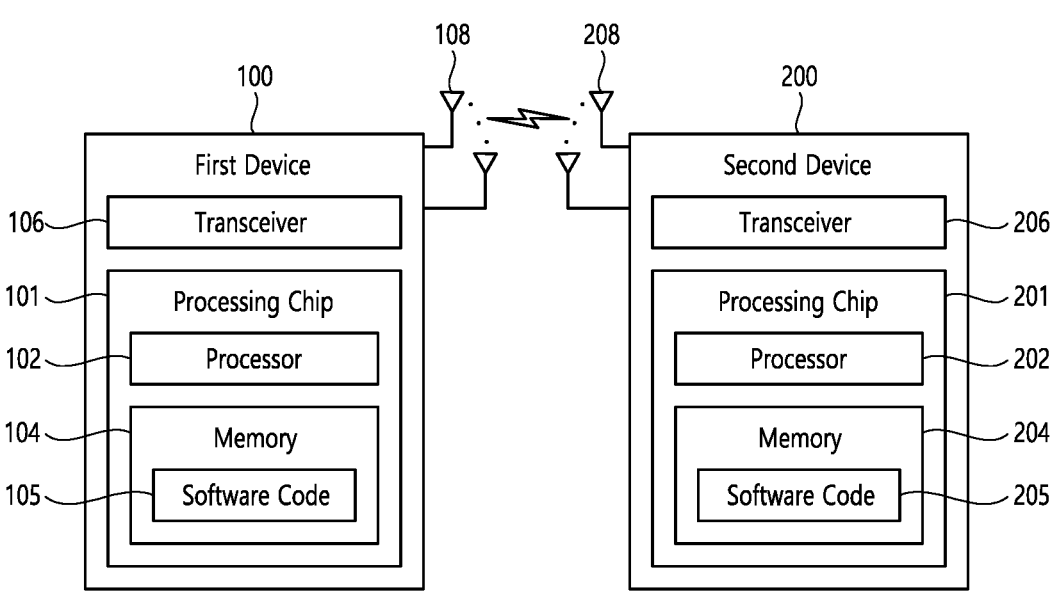
FIG. 2 shows an example of wireless devices to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure. "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information"

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
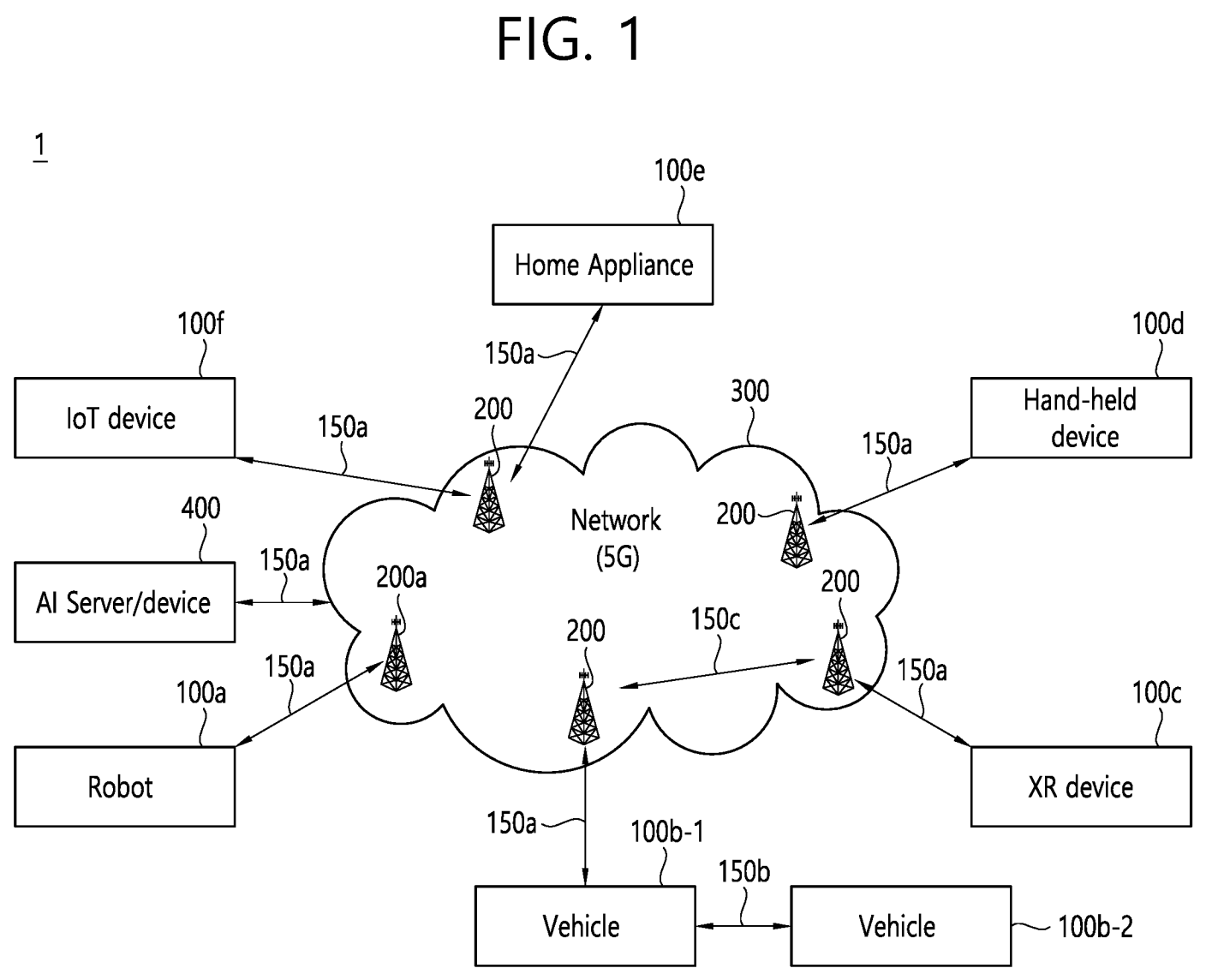

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them.

Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military; etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHZ, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

FIG. 2 Shows an Example of Wireless Devices to which Implementations of the Present Disclosure is Applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
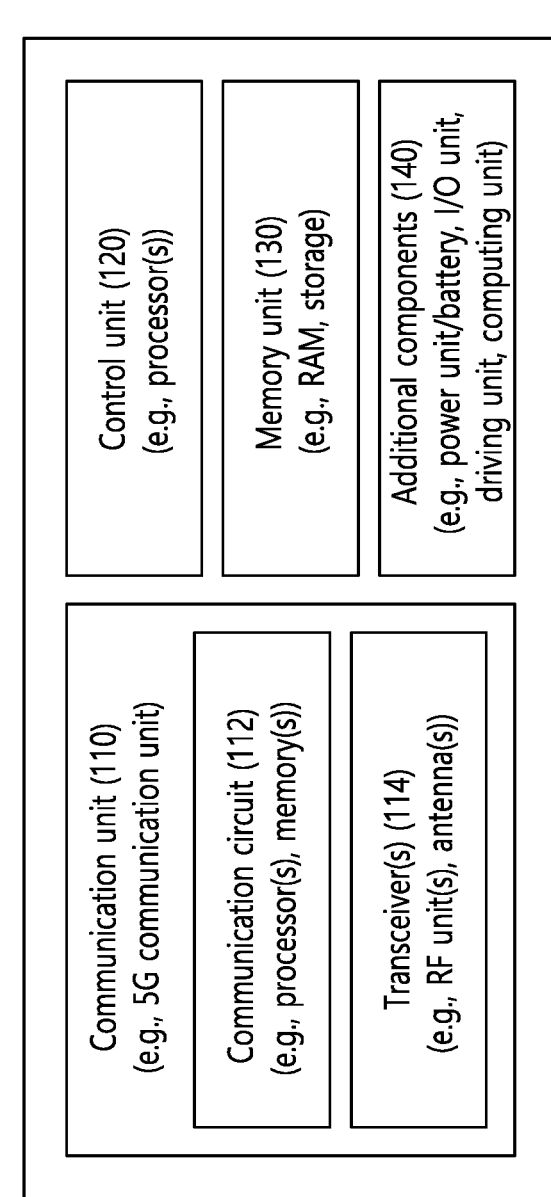
FIG. 3 shows an example of a wireless device to which implementations of the present disclosure is applied.

FIG. 3 Shows an Example of a Wireless Device to which Implementations of the Present Disclosure is Applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
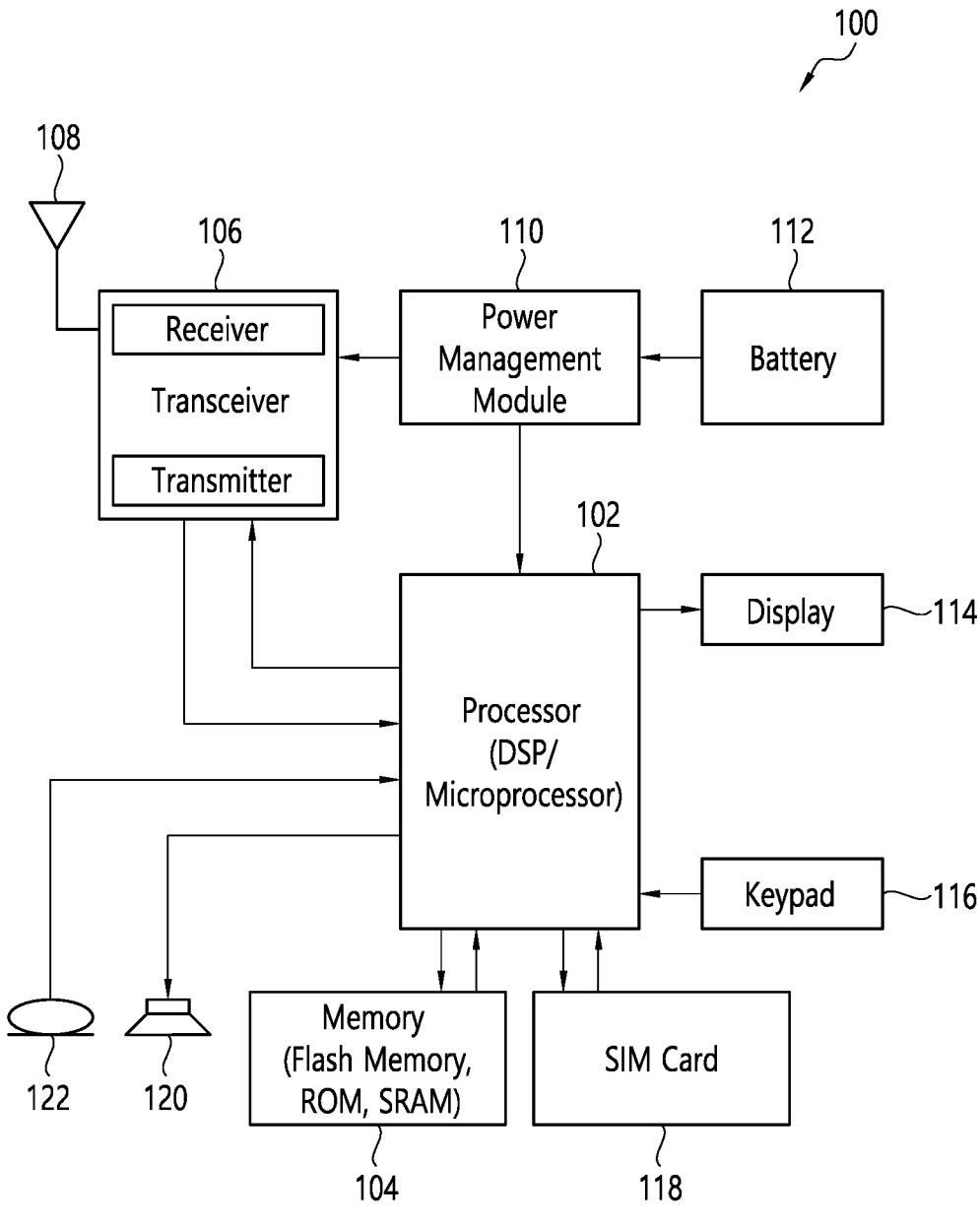
FIG. 4 shows an example of UE to which implementations of the present disclosure is applied.

FIG. 4 Shows an Example of UE to which Implementations of the Present Disclosure is Applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
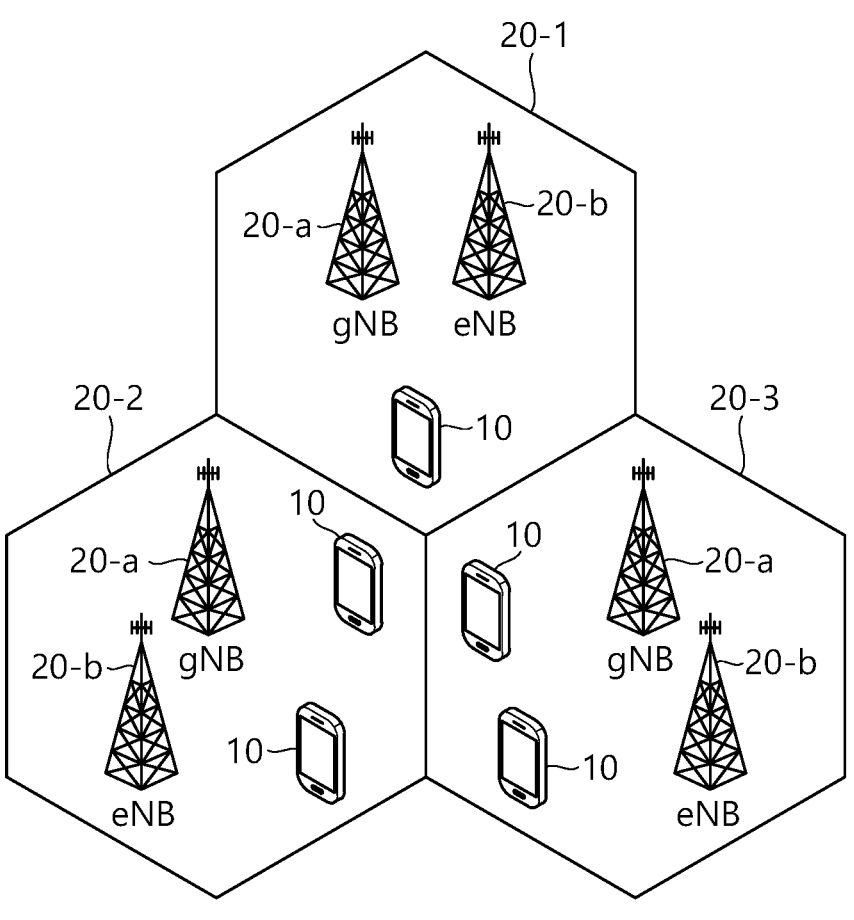
FIG. 5 is an example of a wireless communication system.

FIG. 5 is an Example of a Wireless Communication System.

As can be seen with reference to FIG. 5, a wireless communication system includes at least one base station (BS). The BS is divided into a gNodeB (or gNB) 20a and an eNodeB (or an eNB) 20b. The gNB 20a supports 5G mobile communication. The eNB 20b supports 4G mobile communication, that is, long term evolution (LTE).

Each base station 20a and 20b provides a communication service for a specific geographic area (generally referred to as a cell) (20-1, 20-2, and 20-3). A cell may be again divided into a plurality of regions (referred to as sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Figure 6A:
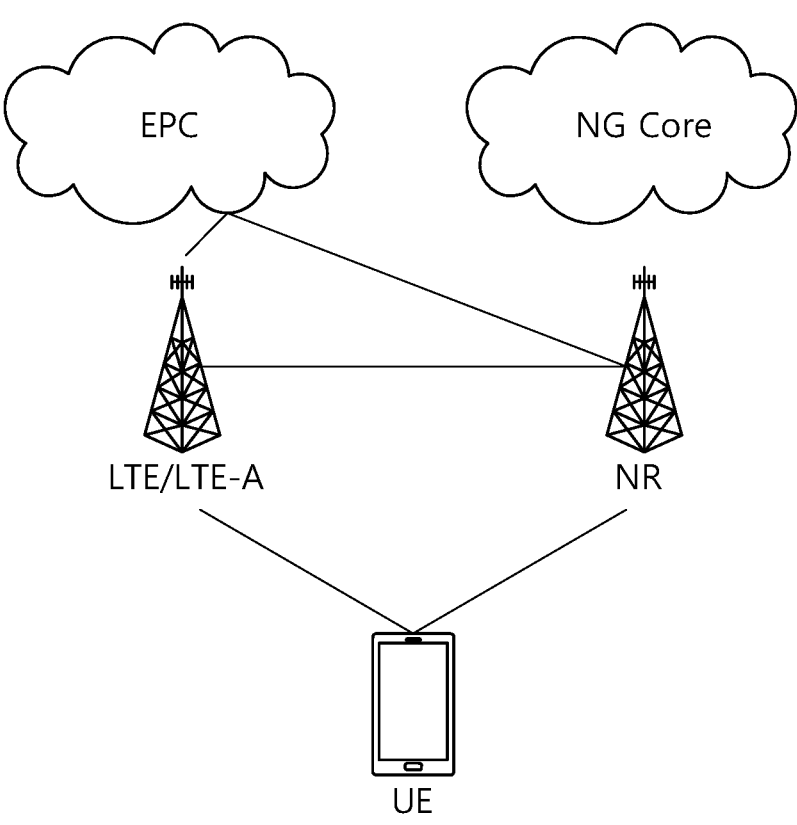
FIGS. 6a to 6c are exemplary diagrams illustrating exemplary architectures for next-generation mobile communication services.
Figure 6B:
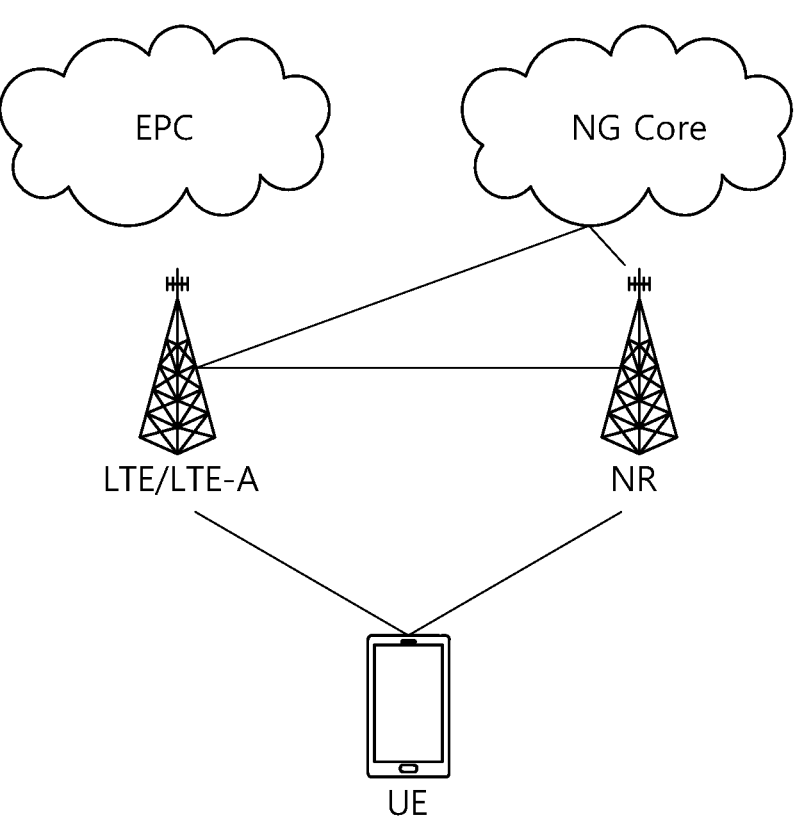
Figure 6C:
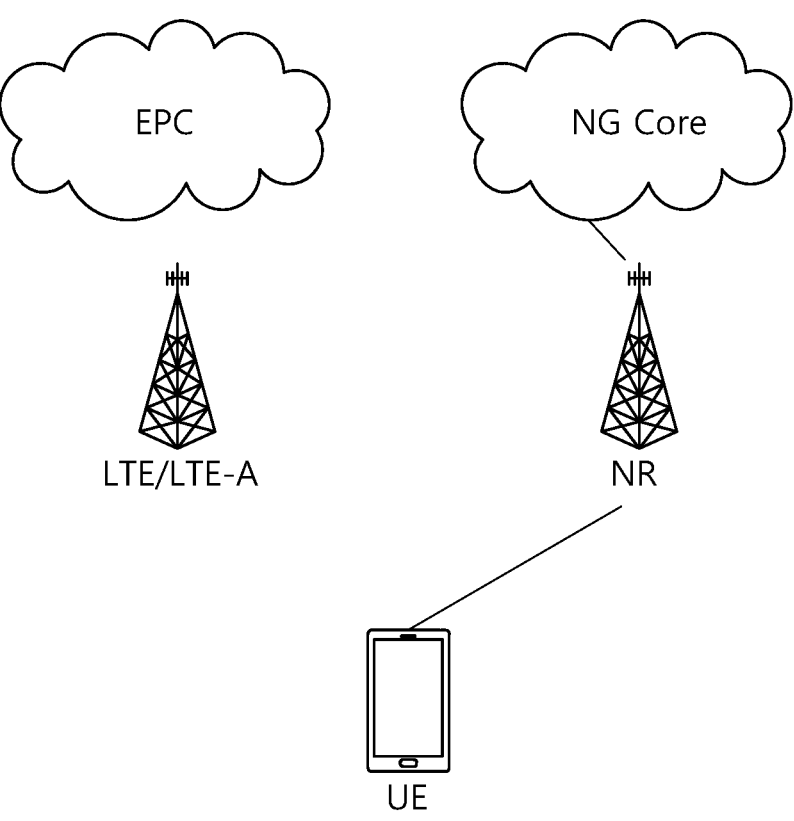

FIGS. 6a to 6c are Exemplary Diagrams Illustrating Exemplary Architectures for Next-Generation Mobile Communication Services.

Referring to FIG. 6a, the UE is connected to the LTE/LTE-A-based cell and the NR-based cell in a DC (dual connectivity) manner.

The NR-based cell is connected to a core network for the existing 4G mobile communication, that is, an Evolved Packet Core (EPC).

Referring to FIG. 6b, unlike FIG. 6a, an LTE/LTE-A-based cell is connected to a core network for 5G mobile communication, that is, a Next Generation (NG) core network.

A service method based on the architecture shown in FIGS. 6a and 6b is referred to as a non-standalone (NSA).

Referring to FIG. 6c, the UE is connected only to an NR-based cell. A service method based on this architecture is called standalone (SA).

<SS Block in NR>

In the 5G NR, information required for a UE to perform an initial access, that is, a Physical Broadcast Channel (PBCH) including a Master Information Block (MIB) and a synchronization signal (SS) (including PSS and SSS) are defined as an SS block. In addition, a plurality of SS blocks may be grouped and defined as an SS burst, and a plurality of SS bursts may be grouped and defined as an SS burst set. It is assumed that each SS block is beamformed in a particular direction, and various SS blocks existing in an SS burst set are designed to support UEs existing in different directions.

Figure 7:
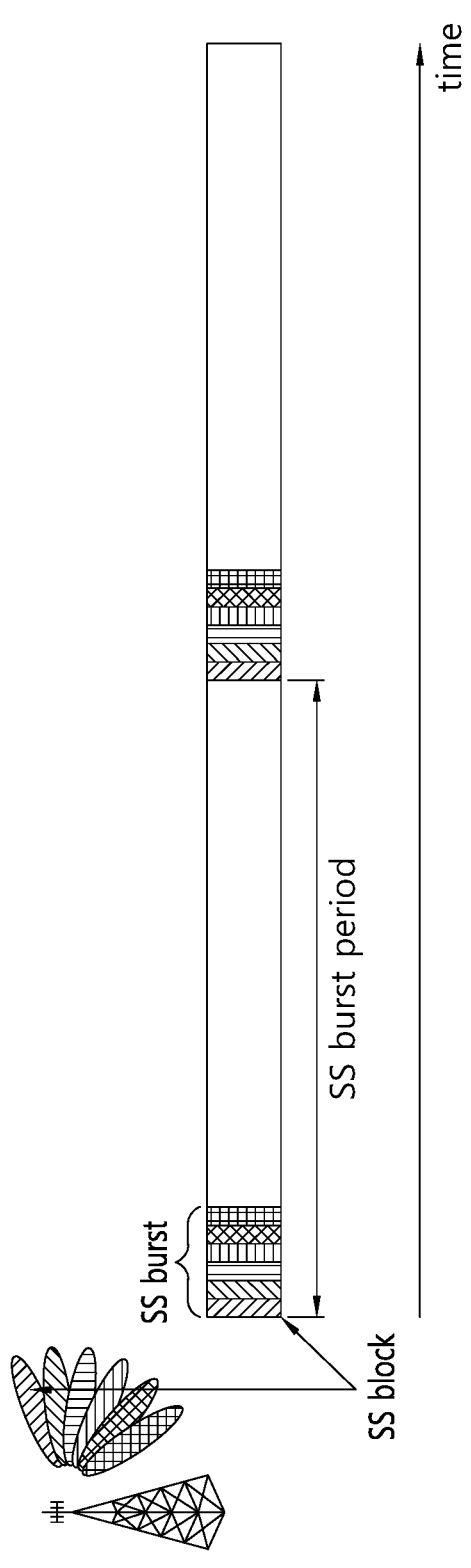
FIG. 7 shows a diagram illustrating an example of an SS block in NR.

FIG. 7 Shows a Diagram Illustrating an Example of an SS Block in NR.

Referring to FIG. 7, an SS burst is transmitted in every predetermined periodicity. Accordingly, a UE receives SS blocks, and performs cell detection and measurement.

Meanwhile, in the 5G NR, beam sweeping is performed on an SS. A detailed description thereof will be provided with reference to FIG. 8.

Figure 8:
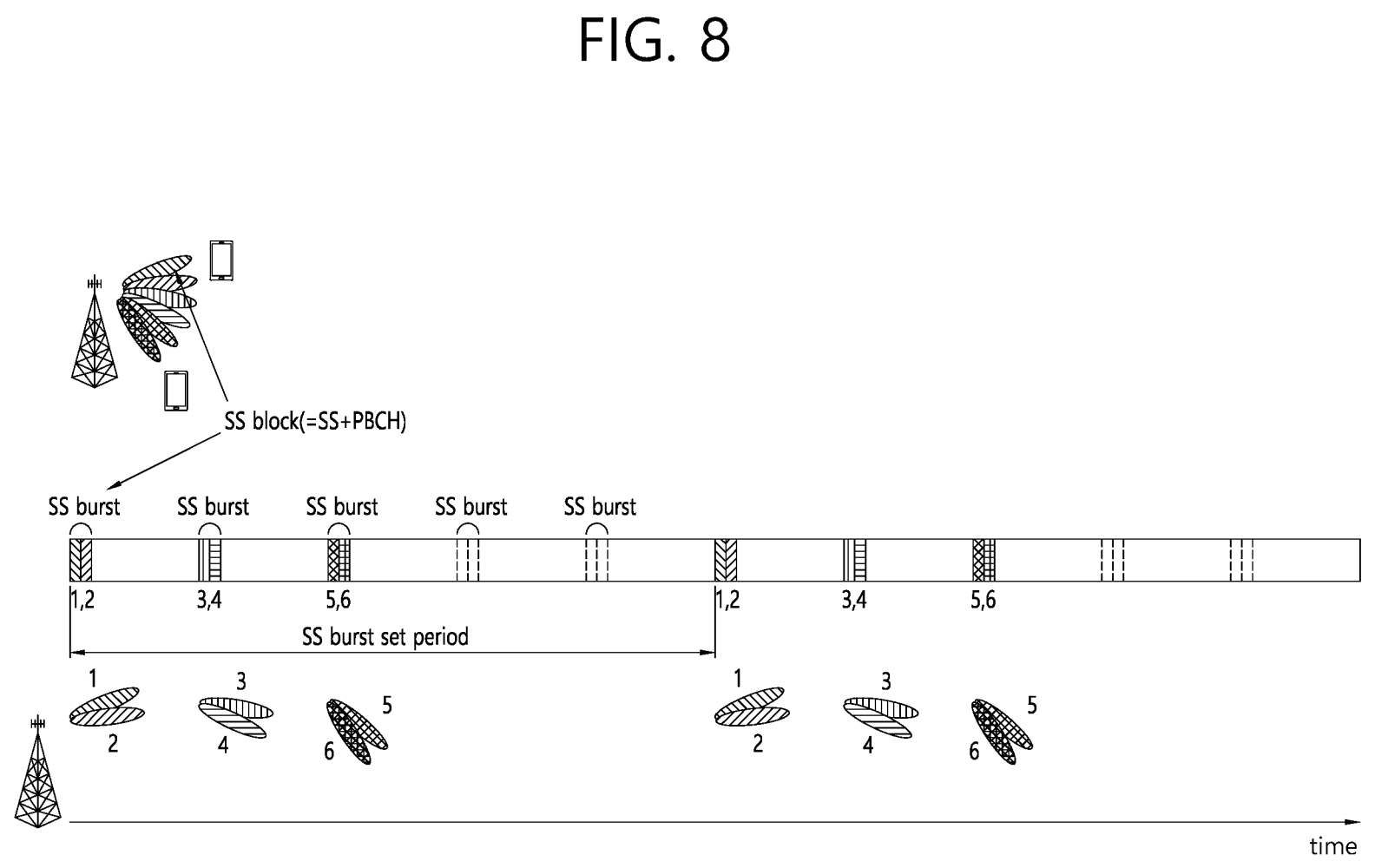

FIG. 8 Shows a Diagram Illustrating an Example of Beam Sweeping in the NR.

A base station transmits each SS block in an SS burst over time while performing beam sweeping. In this case, multiple SS blocks in an SS burst set are transmitted to support UEs existing in different directions. In FIG. 8, the SS burst set includes one to six SS blocks, and each SS burst includes two SS blocks.

Figure 9:
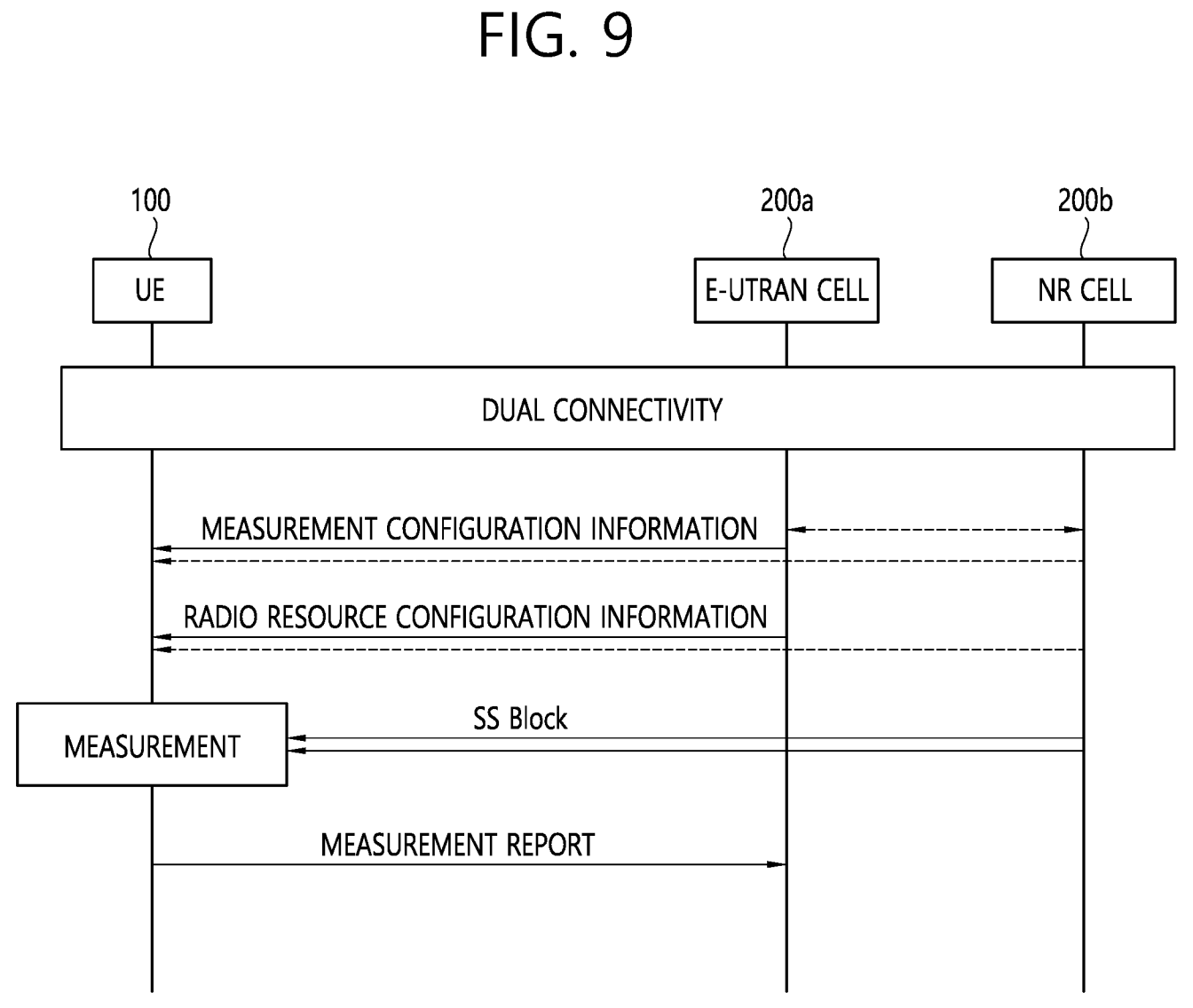

FIG. 9 Shows an Example of Performing Measurement in E-UTRAN and NR (EN) DC Case.

Referring to FIG. 9, the UE 100 are connected in EN-DC with an E-UTRAN (that is, LTE/LTE-A) cell. Here, a Pcell in EN-DC may be an E-UTRAN (that is, LTE/LTE-A) cell, and a PSCell in EN-DC may be an NR cell.

The UE 100 may receive measurement configuration (or "measconfig") information element (IE) of the E-UTRAN (that is, LTE/LTE-A) cell. The measurement configuration (or "measconfig") IE received from the E-UTRAN (that is, LTE/LTE-A) cell may further include fields shown in the following table, in addition to the fields shown in Table 3.

TABLE 3

| MeasConfig field description |
| --- |
| frl-Gap<br>This field exists when a UE is configured with EN-DC. This field indicates whether a gap is applied to perform measurement on FR1 band<br>mgta<br>It indicates whether to apply a timing advance (TA) of 0.5 ms for a measurement gap configuration provided by the E-UTRAN. |

The measurement configuration (or "measconfig") IE may further include a measGapConfig field for setting a measurement gap (MG), as shown in Table 4. A gapoffset field within the measGapConfig field may further include gp4, gp5, . . . , gp11 for EN-DC, in addition to the example shown in Table 5.

Meanwhile, the UE 100 may receive a measurement configuration ("measconfig") IE of an NR cell, which is a PSCell, directly from the NR cell or through the E-UTRAN cell which is a Pcell.

Meanwhile, the measurement configuration ("measconfig") IE of the NR cell may include fields as shown in the following table.

TABLE 4

| MeasConfig field description |
| --- |
| measGapConfig<br>It indicates configuration or cancelation of a measurement gap<br>s-MeasureConfig<br>It indicates a threshold value for measurement of NR SpCell RSRP when a UE needs to perform measurement on a non-serving cell. |

The above measGapConfig may further include fields as shown in the following table.

TABLE 5

| MeasGapConfig field description |
| --- |
| gapFR2<br>It indicates a measurement gap configuration applicable for FR2 frequency range.<br>gapOffset<br>It indicates a gap offset of a gap pattern with an MGRP.<br>mgl<br>It indicates a measurement gap length by ms. There may be 3 ms, 4 ms, 6 ms, etc.<br>mgrp<br>It indicates a measurement gap repetition period by ms.<br>mgta<br>It indicates whether to apply a timing advance (TA) of 0.5 ms for a measurement gap configuration. |

Meanwhile, the UE 100 receives a radio resource configuration information element (IE) of the E-UTRAN (that is, LTE/LTE-A) cell which is a Pcell. In addition, the UE may receive a radio resource configuration IE of an NR cell, which is a PSCell, from the NR cell or through the E-UTRAN cell which is a Pcell. The radio resource configuration IE includes subframe pattern information. The UE 100 performs measurement and reports a measurement result. Specifically, the UE 100 interrupts data transmission and reception with the E-UTRAN (that is, LTE/LTE-A) cell during the measurement gap, retunes its own RF chain, and performs measurement based on receipt of an SS block from an NR cell.

Figure 10:
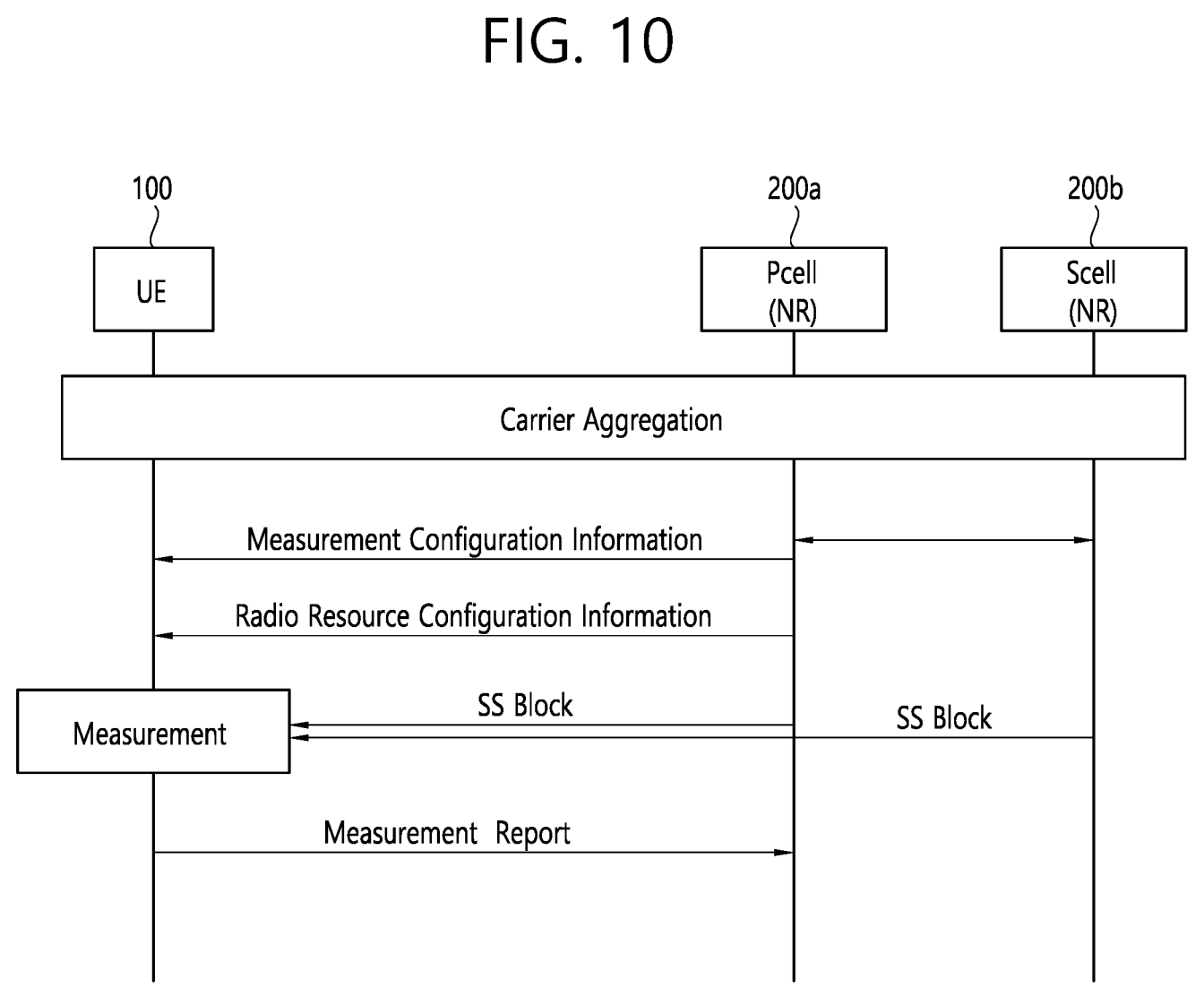

FIG. 10 Shows an Example of Performing Measurement in NR Carrier Aggregation Case.

Referring to FIG. 10, the UE 100 is configured for a carrier aggregation with a first cell (e.g, Pcell) and a second cell (e.g Scell). Here, the Pcell may be an NR based cell, and the Scell may be an NR based cell.

The UE 100 may receive measurement configuration (or "measconfig") information element (IE). The measurement configuration (or "measconfig") IE may include fields shown in the above tables.

The UE 100 receives a radio resource configuration information element (IE).

The UE 100 performs measurement and reports a measurement result.

<Measurement Gap>

UEs shall support the measurement gap patterns listed in Table 6 based on the applicability specified in table 7 and 8. UE determines measurement gap timing based on gap offset configuration and measurement gap timing advance configuration provided by higher layer signaling.

Table 6 shows Gap Pattern Configurations.

TABLE 6

| Gap Pattern Id | Measurement Gap Length (MGL, ms) | Measurement Gap Repetition Period (MGRP, ms) |
| --- | --- | --- |
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

Table 7 shows Applicability for Gap Pattern Configurations supported by the E-UTRA-NR dual connectivity UE.

17

TABLE 7

| Measurement gap pattern configuration | Serving cell | Measurement Purpose | Applicable Gap Pattern Id |
|---|---|---|---|
| Per-UE measurement gap | E-UTRA + FR1, or | non-NR RAT [Note1,2] | 0, 1, 2, 3 |
| | E-UTRA + FR2, or | FR1 and/or FR2 | 0-11 |
| | E-UTRA + FR1 + FR2 | non-NR RAT [Note1,2] and FR1 and/or FR2 | 0, 1, 2, 3 |
| Per FR measurement gap | E-UTRA and, FR1 if configured | non-NR RAT [Note1,2] | 0, 1, 2, 3 |
| | FR2 if configured | | No gap |
| | E-UTRA and, FR1 if configured | FR1 only | 0-11 |
| | FR2 if configured | | No gap |
| | E-UTRA and, FR1 if configured | FR2 only | No gap |
| | FR2 if configured | | 12-23 |
| | E-UTRA and, FR1 if configured | non-NR RAT [Note1,2] and FR1 | 0, 1, 2, 3 |
| | FR2 if configured | | No gap |
| | E-UTRA and, FR1 if configured | FR1 and FR2 | 0-11 |
| | FR2 if configured | | 12-23 |
| | E-UTRA and, FR1 if configured | non-NR RAT [Note1,2] and FR2 | 0, 1, 2, 3 |
| | FR2 if configured | | 12-23 |
| | E-UTRA and, FR1 if configured | non-NR RAT [Note1,2] and FR1 and FR2 | 0, 1, 2, 3 |
| | FR2 if configured | | 12-23 |

Note:
if GSM or UTRA TDD or UTRA FDD inter-RAT frequency layer is configured to be monitered, only measurement gap pattern #0 and #1 can be used for per-FR gap in E-UTRA and FR1 if configured, or for per-UE gap.
Note 1:

Non-NR RAT includes E-UTRA, UTRA and/or GSM.
Note 2:

The gap pattern 2 and 3 are supported by UEs which support shortMeasurementGap-r14.
NOTE 3:
When E-UTRA inter-frequency RSTD measurements are configured and the UE requires measurement gaps for performing such measurements, only Gap Pattern #0 can be used.

For E-UTRA-NR dual connectivity, when serving cells are on E-UTRA and FR1, measurement objects are in both E-UTRA/FR1 and FR2-If MN indicates UE that the measurement gap from MN applies to E-UTRA/FR1/FR2 serving cells, UE fulfils the per-UE measurement requirements for both E-UTRA/FR1 and FR2 measurement objects based on the measurement gap pattern configured by MN;

If MN indicates UE that the measurement gap from MN applies to only LTE/FR1 serving cell(s),
UE fulfils the measurement requirements for FR1/LTE measurement objects based on the configured measurement gap pattern;
UE fulfils the requirements for FR2 measurement objects based on effective MGRP=20 ms;
When serving cells are in E-UTRA, FR1 and FR2, Measurement objects are in both E-UTRA/FR1 and FR2,
If MN indicates UE that the measurement gap from MN applies to E-UTRA/FR1/FR2 serving cells, UE fulfils the per-UE measurement requirements for both E-UTRA/FR1 and FR2 measurement objects based on the measurement gap pattern configured by MN.

Table 8 shows Applicability for Gap Pattern Configurations supported by the UE with NR standalone operation.

TABLE 8

| Measurement gap pattern configuration | Serving cell | Measurement Purpose [NOTE 2] | Applicable Gap Pattern Id |
|---|---|---|---|
| Per-UE measurement gap | FR1, or FR1 + FR2 | E-UTRA only | 0, 1, 2, 3 |
| | | FR1 and/or FR2 | 0-11 |
| | | E-UTRAN and FR1 and/or FR2 | 0, 1, 2, 3 |
| | FR2 | E-UTRA only | 0, 1, 2, 3 |
| | | FR1 only | 0-11 |
| | | FR1 and FR2 | 0-11 |
| | | E-UTRAN and FR1 and/or FR2 | 0, 1, 2, 3 |
| | | FR2 only | 12-23 |
| Per FR measurement gap | FR1 if configured | E-UTRA only | 0, 1, 2, 3 |
| | FR2 if configured | | No gap |
| | FR1 if configured | FR1 only | 0-11 |
| | FR2 if configured | | No gap |
| | FR1 if configured | FR2 only | No gap |
| | FR2 if configured | | 12-23 |
| | FR1 if configured | E-UTRA and FR1 | 0, 1, 2, 3 |
| | FR2 if configured | | No gap |
| | FR1 if configured | FR1 and FR2 | 0-11 |
| | FR2 if configured | | 12-23 |
| | FR1 if configured | E-UTRA and FR2 | 0, 1, 2, 3 |
| | FR2 if configured | | 12-23 |
| | FR1 if configured | E-UTRA and | 0, 1, 2, 3 |
| | FR2 if configured | FR1 and FR2 | 12-23 |

NOTE 1:
When E-UTRA inter-RAT RSTD measurements are configured and the UE requires measurement gaps for performing such measurements, only Gap Pattern #0 can be used.
NOTE 2:
Measurement purpose which includes E-UTRA measurements includes also inter-RAT E-UTRA RSRP and RSRQ measurements for E-CID <Non-Terrestrial Networks>

A non-terrestrial network refers to a network, or segment of networks using RF resources on board a satellite (or UAS platform).

Figure 11:
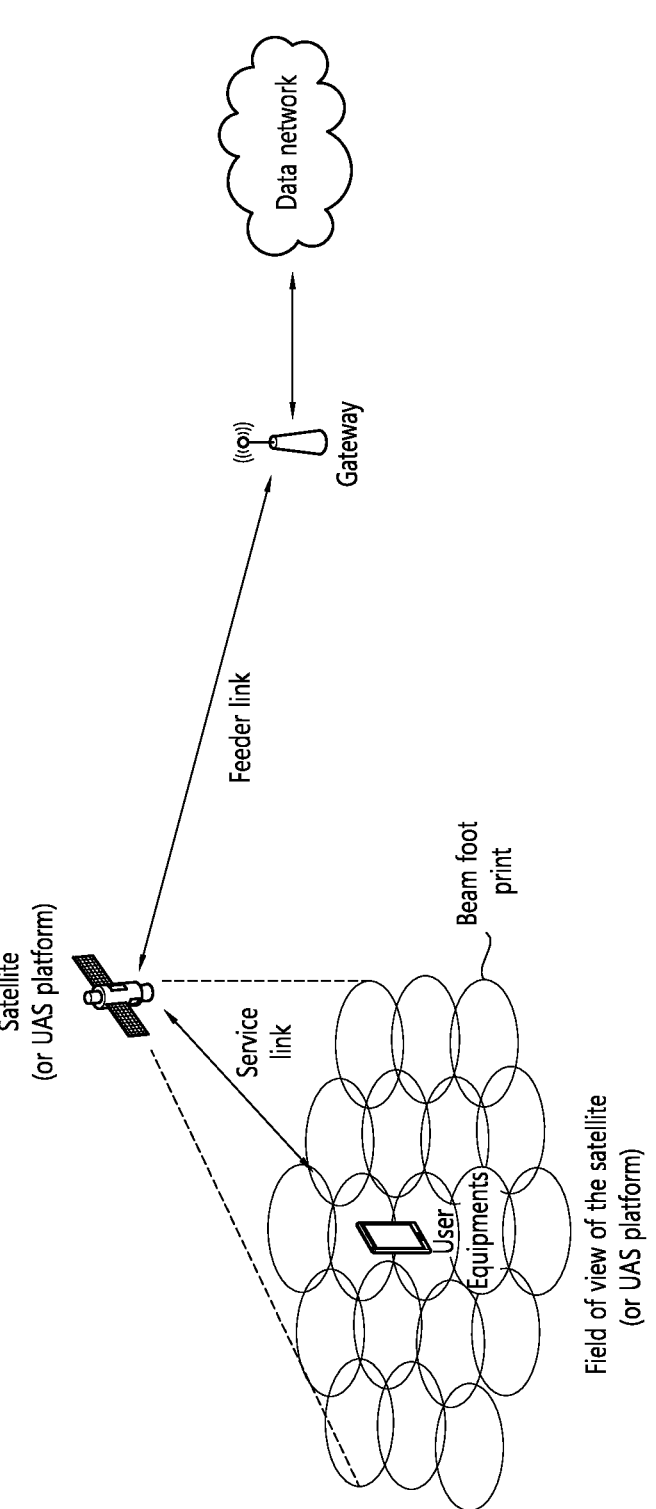
FIG. 11 shows Non-terrestrial network typical scenario based on transparent payload.

The typical scenario of a non-terrestrial network providing access to user equipment is depicted below:

FIG. 11 Shows Non-Terrestrial Network Typical Scenario Based on Transparent Payload.

Figure 12:
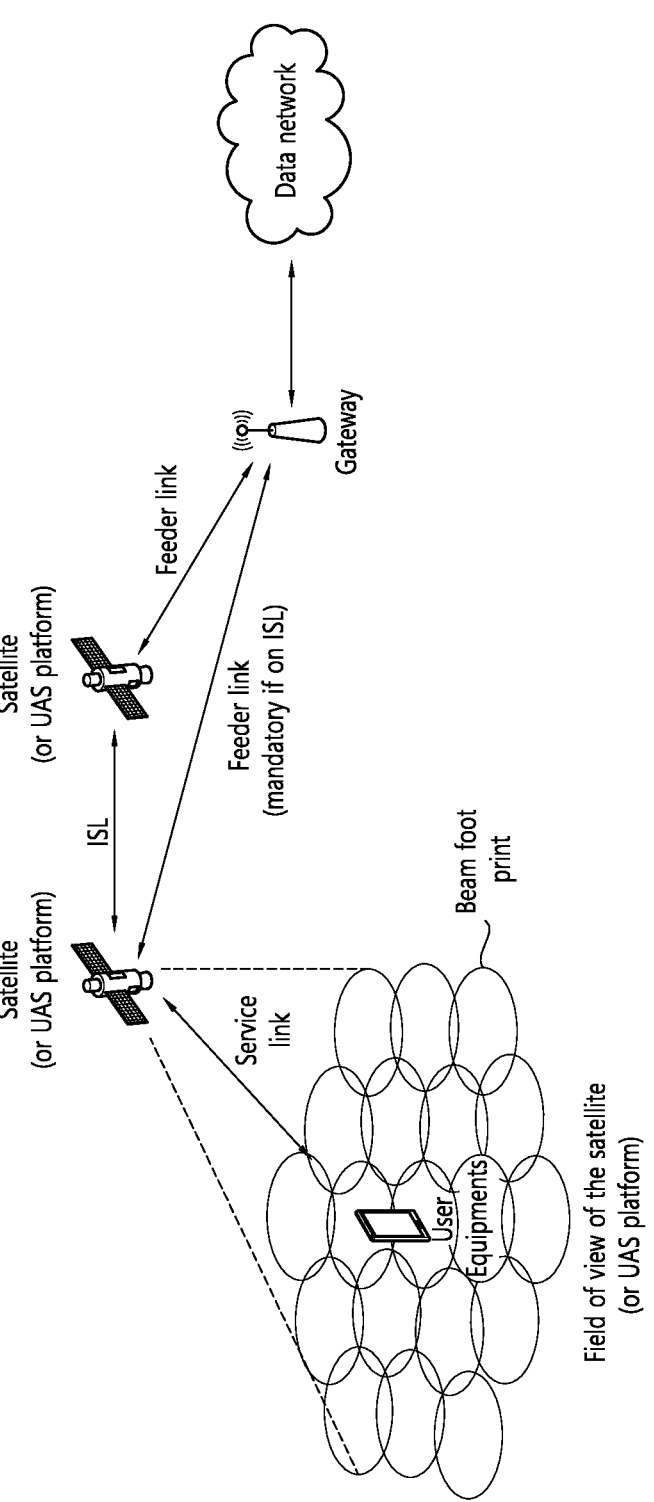
FIG. 12 shows Non-terrestrial network typical scenario based on regenerative payload.

FIG. 12 Shows Non-Terrestrial Network Typical Scenario Based on Regenerative Payload.

Non-Terrestrial Network typically features the following elements:

One or several sat-gateways that connect the Non-Terrestrial Network to a public data network
A GEO satellite is fed by one or several sat-gateways which are deployed across the satellite targeted coverage (e.g. regional or even continental coverage). We assume that UE in a cell are served by only one sat-gateway A Non-GEO satellite served successively by one or several sat-gateways at a time. The system ensures service and feeder link continuity between the successive serving sat-gateways with sufficient time duration to proceed with mobility anchoring and hand-over A Feeder link or radio link between a sat-gateway and the satellite (or UAS platform)

A service link or radio link between the user equipment and the satellite (or UAS platform).

A satellite (or UAS platform) which may implement either a transparent or a regenerative (with on board processing) payload. The satellite (or UAS platform) generate beams typically generate several beams over a given service area bounded by its field of view: The footprints of the beams are typically of elliptic shape. The field of view of a satellites (or UAS platforms) depends on the on board antenna diagram and min elevation angle.

A transparent payload: Radio Frequency filtering, Frequency conversion and amplification. Hence, the waveform signal repeated by the payload is un-changed;

A regenerative payload: Radio Frequency filtering, Frequency conversion and amplification as well as demodulation/decoding, switch and/or routing, coding/modulation. This is effectively equivalent to having all or part of base station functions (e.g. gNB) on board the satellite (or UAS platform).

Inter-satellite links (ISL) optionally in case of a constellation of satellites. This will require regenerative payloads on board the satellites. ISL may operate in RF frequency or optical bands.

User Equipment are served by the satellite (or UAS platform) within the targeted service area.

There may be different types of satellites (or UAS platforms) listed here under:

Table 9 shows Types of NTN platforms.

TABLE 9

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position fixed in terms of | 200-3500 km |
| UAS platform (including HAPS) | 8-50 km (20 km for HAPS) | elevation/azimuth with respect to a given earth point | 5-200 km |
| High Elliptical Orbit (HEO) satellite | 400-50000 km | Elliptical around the earth | 200-3500 km |

GEO satellite and UAS are used to provide continental, regional or local service. A constellation of LEO and MEO is used to provide services in both Northern and Southern hemispheres. In some case, the constellation can even provide global coverage including polar regions. For the later, this requires appropriate orbit inclination, sufficient beams generated and inter-satellite links.

<Problems to be Solved in the Disclosure of this Specification>

NR-based NTN (non-terrestrial network) communication is a method for efficiently providing communication services to regions, where terrestrial network services are not provided, through satellites (geostationary orbiting satellites GEO, low-orbit satellite LEO, etc.). In the case of transparent satellite, the satellite amplifies the signal transmitted from the terrestrial base station (gNB-NTN gateway) and transmits the signal to the UE. In the case of regenerative satellite, in addition to signal amplification, the satellite performs the functions of a terrestrial base station such as routing, coding and modulation, and decoding and demodulation. An NTN terminal has a GPS function and periodically receives location, time, and speed information for NTN satellites.

When a satellite, a base station and UE transmit/receive a radio wave, the propagation delay refers to a delay in receiving the radio wave from one side after transmitting the radio wave at the other side. The propagation delay includes a propagation delay between a base station and a satellite and a propagation delay between a satellite and a UE. The propagation delay between the base station and the satellite can be obtained by calculating based on the position of the terrestrial base station with the satellite. The propagation delay between the satellite and the UE can be calculated by dividing the speed of light by the distance between the UE and the satellite. The propagation delay in the present specification may relate to a propagation delay between satellites and UE.

Figure 13A:
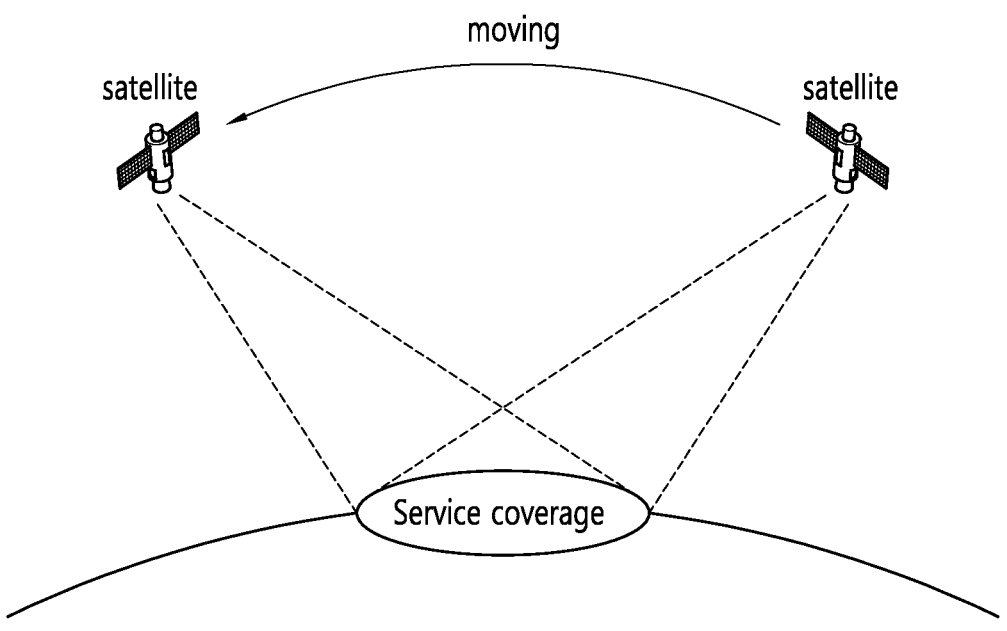
FIG. 13a and FIG. 13b show Service coverage for NGSO satellite according to earth fixed beam and earth moving beam.
Figure 13B:
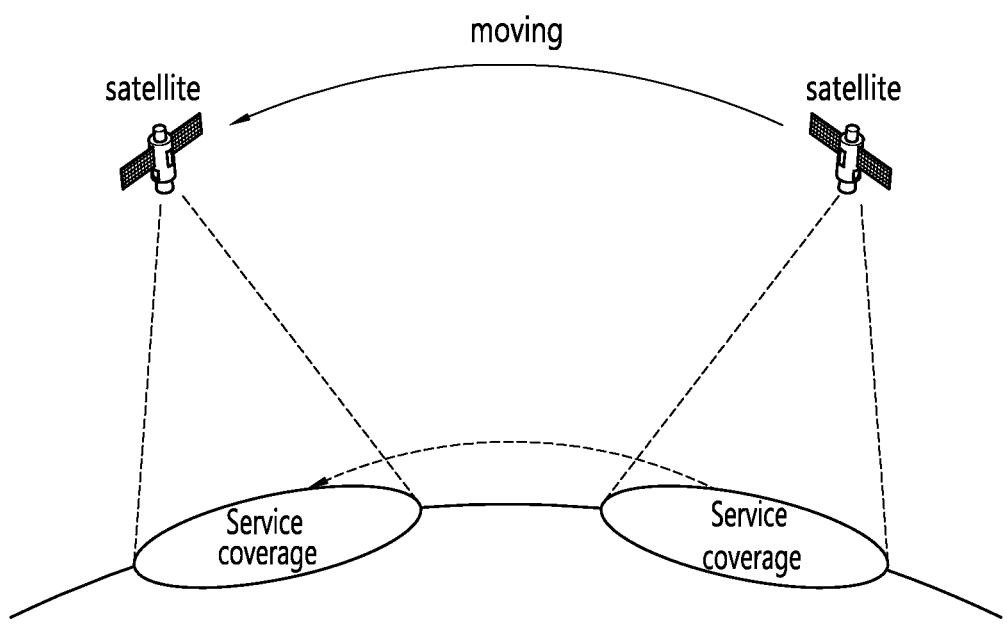

FIG. 13a and FIG. 13b Show Service Coverage for NGSO Satellite According to Earth Fixed Beam and Earth Moving Beam.

In the case of a non-geostationary (NGSO) satellite, it moves in a fixed orbit, establishes a link with a TN base station (NTN gateway) and an NTN UE, and considers two types of service coverage, an earth fixed beam and an earth moving beam. Earth fixed beam maintains fixed service coverage for a certain period of time even if the LEO satellite moves to a certain orbit, and the earth moving beam also moves service coverage when the LEO satellite moves to a certain orbit.

Dual Connectivity (DC) may be considered to improve service continuity, service stability, and data rate in the NTN environment. For example, DC may be configured as a terrestrial base station as a PCell and an NTN satellite as PSCell. DC may be configured a GEO as an NTN satellite as PCell and NGSO as an NTN satellite as PSCell. In addition, DC may be configured with various combinations between terrestrial base stations and NTN satellites.

When considering the measurement gap setting in the current NR, the method of setting the measurement gap according to the DC configuration with the NTN satellite is as follows.

TABLE 10

| DC Scenario | PCell | PSCell | MG configuration | Per-UE gap | Per-FR gap |
|---|---|---|---|---|---|
| EN-DC | LTE terrestrial base station | NTN satellite | PCell | ○ | ○ |
|  |  |  | PSCell | X | X (○ if PSCell is FR2) |
| NE-DC | NTN satellite | LTE terrestrial base station | PCell | ○ | ○ |
|  |  |  | PSCell | X | X |
| NR-DC | NR terrestrial base station | NTN satellite | PCell | ○ | ○ |
|  | NTN satellite | NTN satellite |  |  |  |
|  | NTN satellite | NR terrestrial base station | PSCell | X | X |

In the measurement gap, the PCell configures the MG of the PSCell to the UE in all DC combinations. However, when the PSCell is FR2 in EN-DC and the Per-FR gap is configured, the PSCell configures the MG and informs the UE.

Figure 14A:
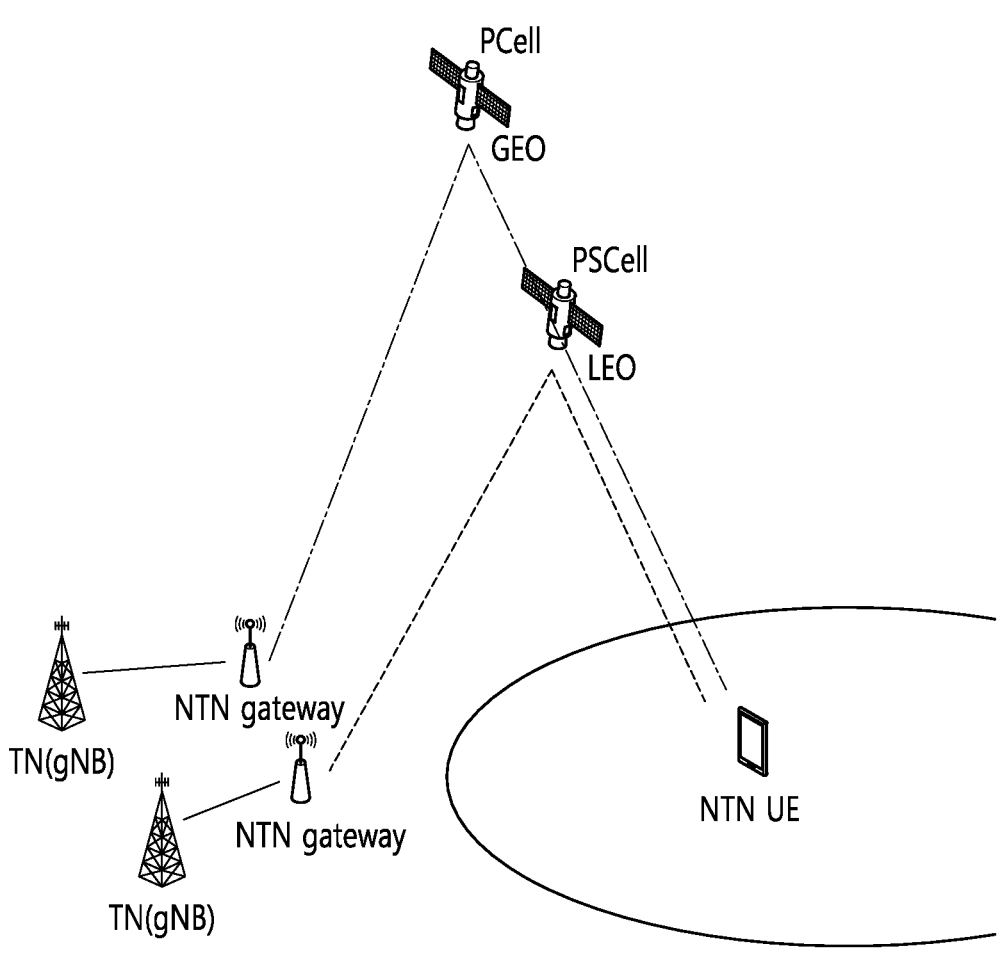
FIG. 14a and FIG. 14b show example of NTN dual connectivity of GEO-LEO and LTE eNB (LEO)-LEO (LTE eNB).
Figure 14B:
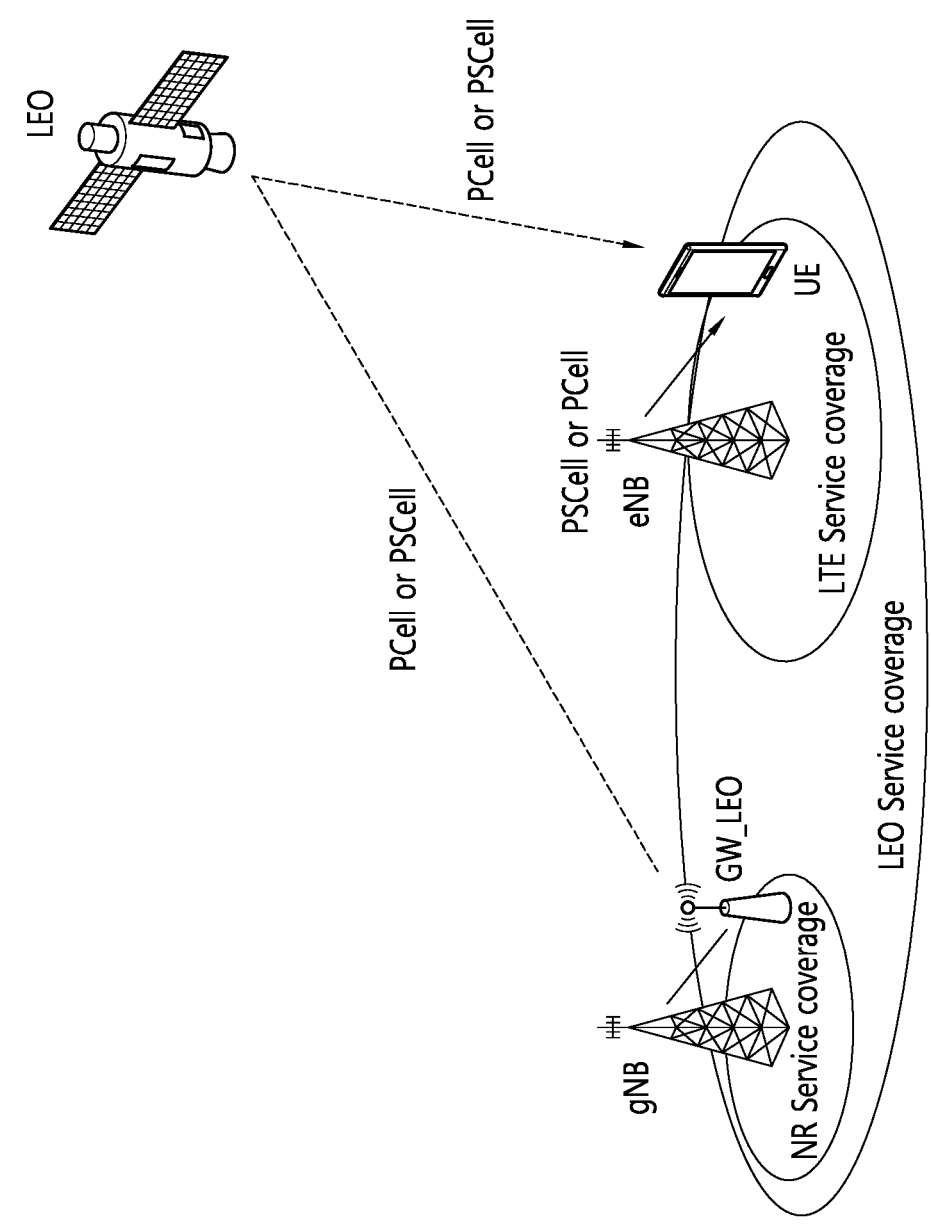

FIG. 14*a* and FIG. 14*b* Show Example of NTN Dual Connectivity of GEO-LEO and LTE eNB(LEO)-LEO(LTE eNB).

FIG. 14*a* shows NTN DC: GEO-LEO and FIG. 14*b* shows EN(NE)-DC: LTE eNB(LEO)-LEO(LTE eNB).

In NTN, when the DC scenario above is considered, since the difference in propagation delay for the UE in the PCell and the PSCell is large, MG configuration is required in consideration of the difference in propagation delay.

<Disclosure of the Present Specification>

DC consists of i) connection between UE and PCell and ii) connection between UE and PSCell. PCell and PSCell are serving cell. UE may measure target cell (i.e. neighbor cell of PCell) in MG, UE may reselect target cell as PCell. Likewise, UE may measure target cell (i.e. neighbor cell of PSCell) in MG, UE may reselect target cell as PSCell.

In NTN environment, PCell may be served by NTN satellite, PSCell may be served by NTN satellite, target cell may be served by NTN satellite In the description below; PSCell by NTN satellite may mean that PSCell is served by NTN satellite. PCell by NTN satellite and target cell by NTN satellite may accordingly cell served by NTN satellite.

1. In Case PCell Configures MG for PSCell

If the PSCell is not in the FR2 frequency band, the PCell should configure the MG for the PSCell. That is, if the NTN satellite serves a PSCell, the PCell should configure the MG for PSCell so that UE can measure the target cell (e.g. it may be a terrestrial base station or an NTN satellite, assuming it is an NTN satellite) for PSCell by the NTN satellite.

In the NTN environment, since the difference between a propagation delay of an NTN satellite for PSCell and a propagation delay of an NTN satellite of target cell for PSCell (i.e. neighbor cell of PSCell) is large. Therefore, if the PCell configures MG of PSCell based on the PSCell, it is impossible for UE to properly measure target cell by NTN satellite in the MG.

The UE may report, to the PCell, the timing offset value for the propagation delay of NTN satellite for PSCell and NTN satellite for the target cell. Then the PCell may configure MG for the PSCell in consideration of the reported timing offset. Alternatively, the UE may apply the timing offset to MG configured by the PCell and may inform the PSCell (or PCell) of an indication of whether the timing offset is applied so that PSCell can consider the MG to which the timing offset when the PSCell performs scheduling In addition, since scheduling restriction may be considered even if the MGs of the PCell and the PSCell overlap due to the timing offset, the PSCell must know whether the UE applies timing offset to MG.

Figure 15:
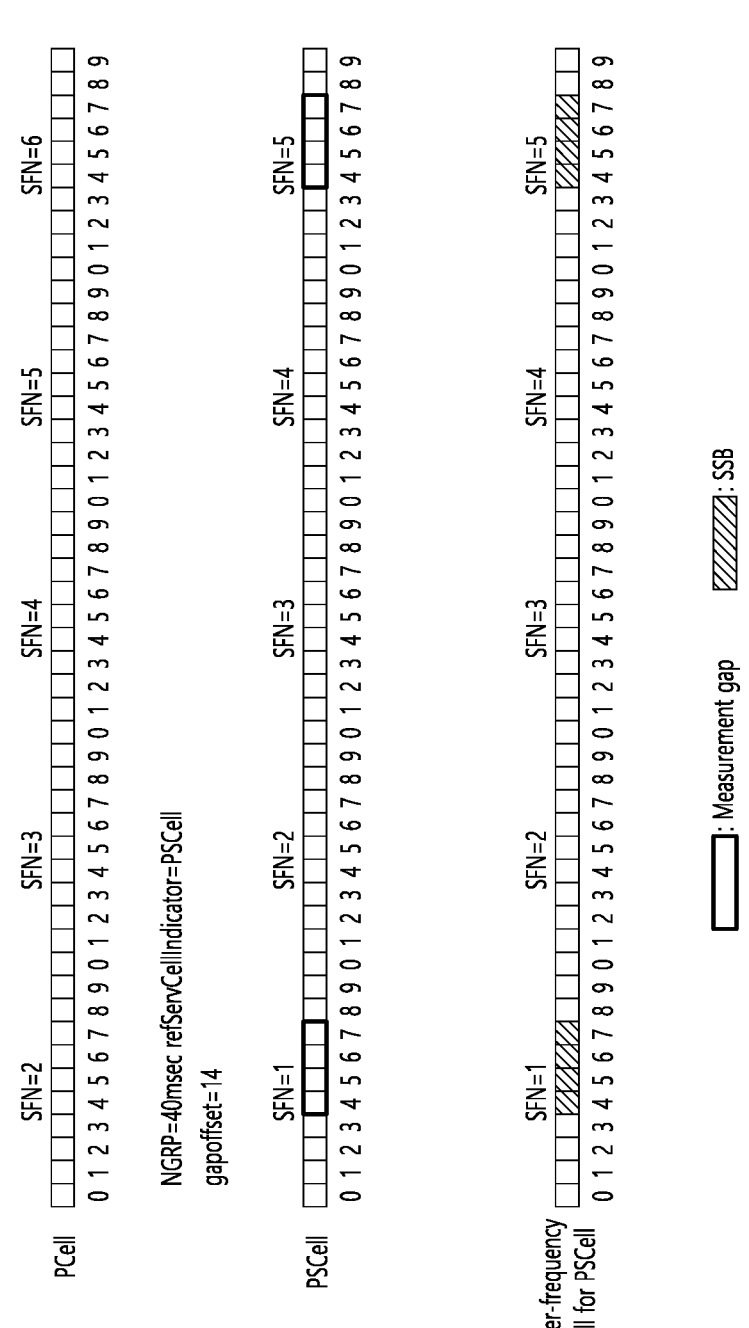
FIG. 15 shows Example of MG configuration without propagation delay according to an embodiment of the present disclosure.

FIG. 15 Shows Example of MG Configuration without Propagation Delay According to an Embodiment of the Present Disclosure.

When i) MGRP (Measurement Gap Repetition Period) is 40 ms, ii) gapoffset is 14, mgl is 4 ms and refServCellIndicator is PSCell if propagation delay is 0, MG may be configured as FIG. 15 based on i) SFN mod (MGRP/10)= FLOOR (gapoffset/10) and ii) Subframe=gapoffset mod 10.

Figure 16:
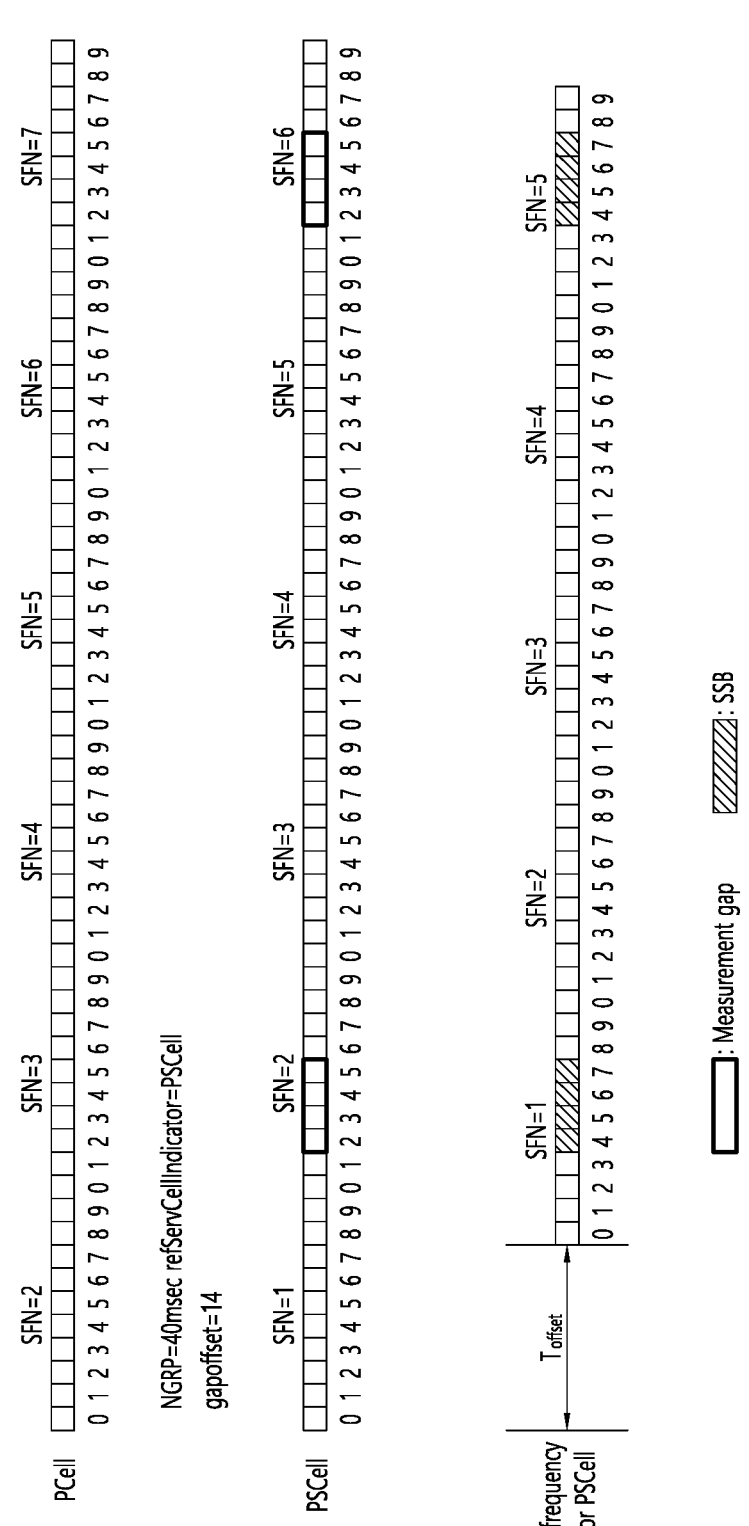
FIG. 16 shows Example of MG configuration with propagation delay according to an embodiment of the present disclosure.

FIG. 16 Shows Example of MG Configuration with Propagation Delay According to an Embodiment of the Present Disclosure.

If timing off set (e.g. $T_{offset}$=ms8) is reported since there is timing off set due to propagation delay between PSCell and NTN satellite for target cell. MG may be configured as FIG. 16 based on i) SFN mod (MGRP/10)=FLOOR ((gapoffset+$T_{offset}$)/10) and ii) Subframe=(gapoffset+$T_{offset}$) mod 10.

If UE supports only Per-UE gap, the UE may support multiple MG. Alternatively, for considering DC configuration for NTN satellites, the UE may support the Per-NTN gap. The Per-NTN gap may mean ability to support each MG independent of the NTN satellite type (e.g., GEO, MEO, LEO, etc.) or frequency band (e.g., S-band, K-band, L-band, etc.).

The above description may be applied in situation of considering NTN CA.

2. In Case PSCell Configures MG for PSCell

In order to efficiently configure MG for NTN satellite. PSCell may independently configure MG regardless of FR. In this case, the PSCell may configure SFN (system frame number) and frame timing difference (SFTD) measurement with the target cell by NTN satellite. The UE may measure the SFTD between the PSCell and the target cell by NTN satellite, and may report it to the PSCell.

3. In Case of Overlapping MGs

Figure 17:
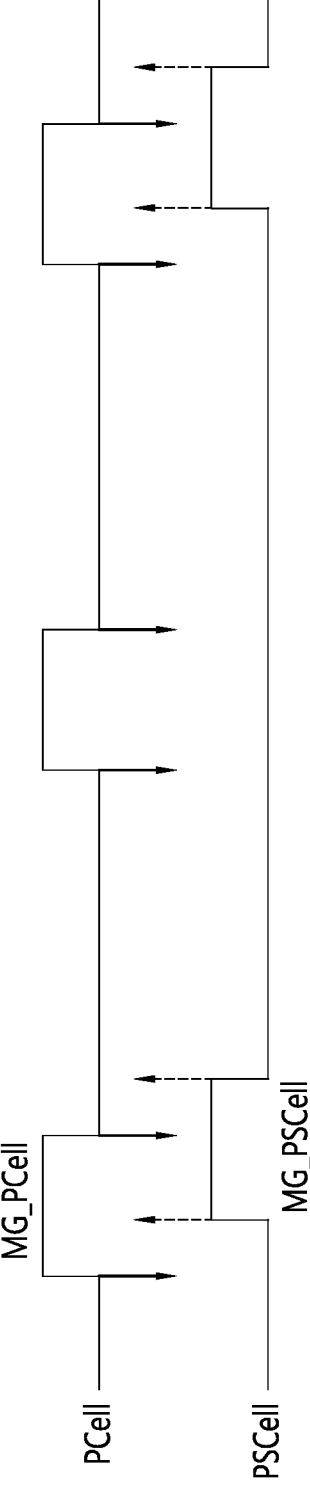
FIG. 17 shows Example of interruption when MGs are overlapped according to an embodiment of the present disclosure.

FIG. 17 Shows Example of Interruption when MGs are Overlapped According to an Embodiment of the Present Disclosure.

When the RF chains for the PCell and the PSCell exist separately, the UE may perform RRM measurement according to the MG configuration for the PCell and the PSCell. If the MG of PCell and MG of PSCell overlap due to i) timing offset caused by propagation delay of NTN satellite or ii) independent configuring MG for PSCell by PSCell, interruption as shown in FIG. 17 occurs. This may be considered when multiple MGs are configured in 5G NR.

If MG for PCell and MG for PSCell overlap. RF retuning of each PCell and PSCell may occur during MG for other cell. A problem may occur in the accuracy of RRM measurement due to interruption. To solve this issue, the network and the UE may perform the following operations. In case the network does not recognize fact that the MG for PCell and MG for PSCell overlap, the UE may inform an indication about the fact to network.

1) Adjusting Timing of RF Retuning

Figure 18:
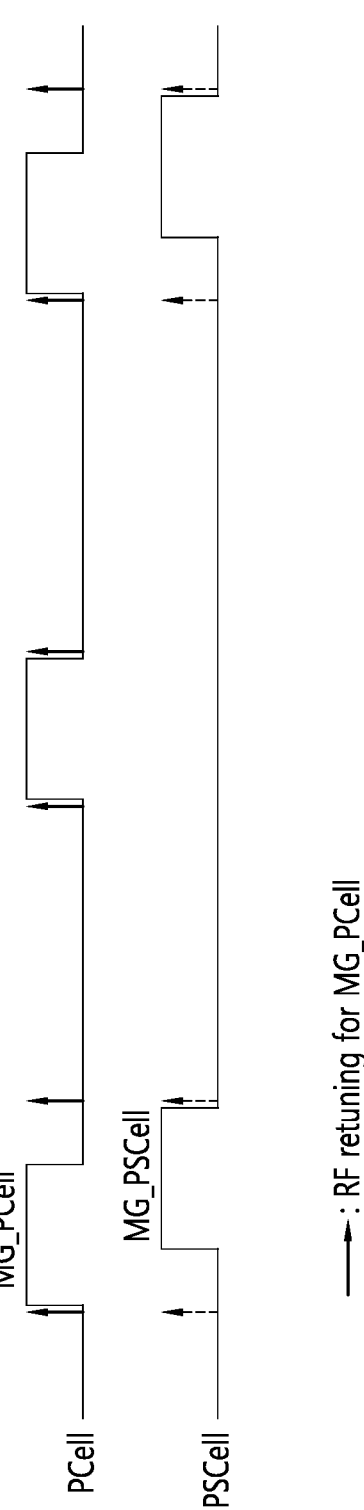
FIG. 18 shows Example of adjustment of RF retuning timing according to an embodiment of the present disclosure.

FIG. 18 Shows Example of Adjustment of RF Retuning Timing According to an Embodiment of the Present Disclosure.

1-1) The UE may avoid interruption during the MG period due to RF retuning by matching the RF retuning timings of MG for PCell and MG for PSCell in the case of overlapping MGs.

1-2) The network may not schedule the time between the RF retuning time and the MG start or end time based on the change of the RF retuning time of the UE, and the UE may not transmit UL/DL signals during that time. That is, the corresponding time may be defined as a scheduling restriction. As FIG. 18, the network may not schedule UL/DL signals in time between end time of MG for PCell and changed RF retuning time. In the same way, the network may not schedule UL/DL signals in time between changed RF retuning time and start time of MG for PCell.

2) Measurement Relaxation

When the MG for PCell and MG for PSCell overlap, the measurement period may be relaxed by P times. P may be a measurement sharing factor. P may be configured by the network according to the priority of measurement.

For example, if the priority of measurement of PCell and PSCell is the same,

In case of 'MGRP for PCell<MGRP for PSCell', P may be considered as follows:

'P=1/(1−MGRP_PCell/MGRP_PSCell)' for PCell measurement period (partially overlapping with PSCell)

'P=2' for PSCell measurement period (fully overlapping with PCell)

In case of 'MGRP for PCell>MGRP for PSCell', P may be considered as follows:

'P=1/(1−MGRP_PSCell/MGRP_PCell)' for PSCell measurement period (partially overlapping with PCell)

'P=2' for PCell measurement period (fully overlapping with PSCell)

In case of 'MGRP for PCell=MGRP for PSCell', P=2 may be considered.

3) Measurement Gap Reconfiguration

Figure 19:
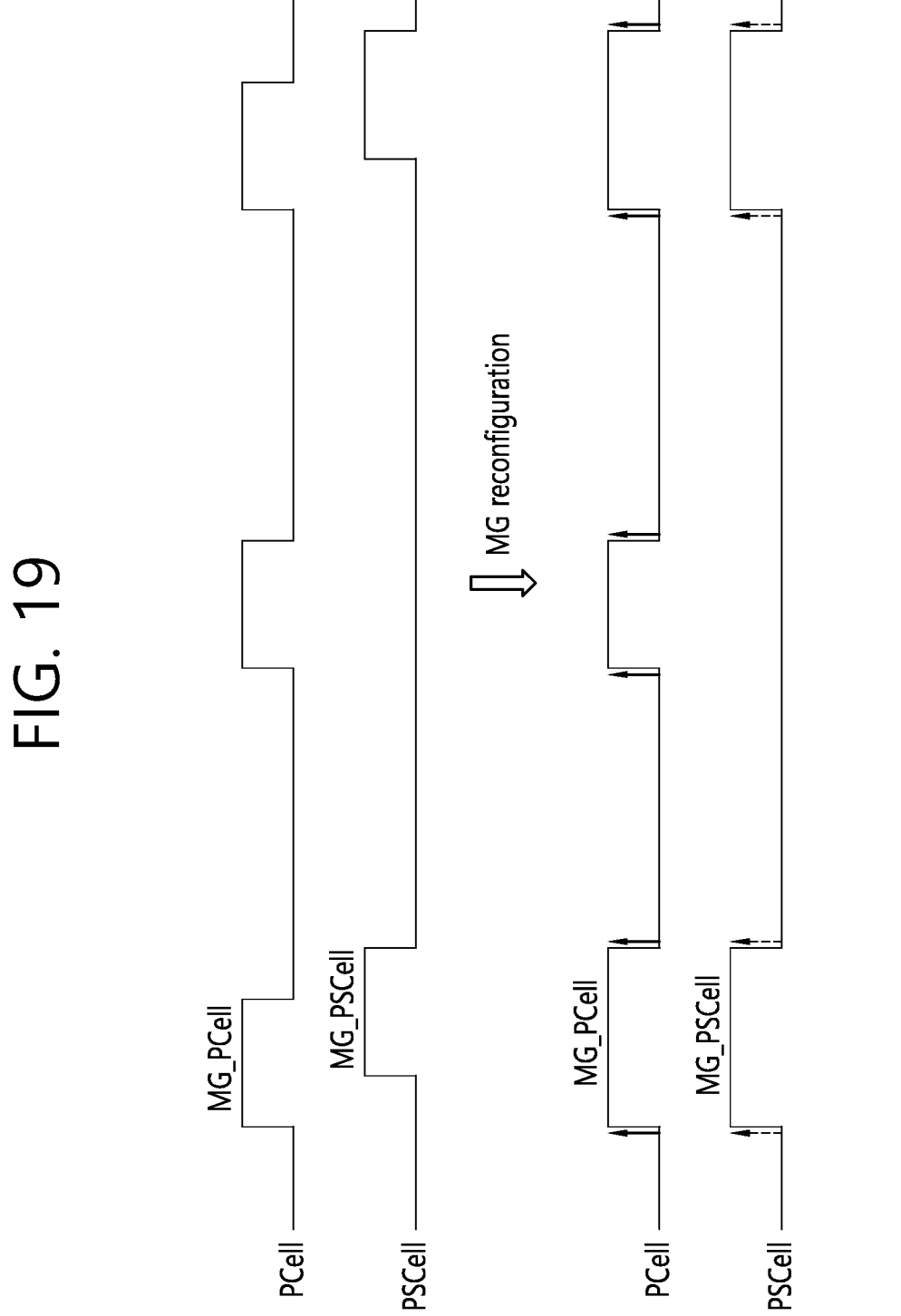
FIG. 19 shows Example of measurement gap reconfiguration according to an embodiment of the present disclosure.

FIG. 19 Shows Example of Measurement Gap Reconfiguration According to an Embodiment of the Present Disclosure.

When MGs overlap, the network may reconfigure MG durations to one MG duration for overlapped MGs. Then interruption by retuning for MG may be avoided. In this case, the UE may have the capability to perform multiple MGs.

For example, reconfigured MG for PCell and PSCell may include MG for PCell before reconfiguration and MG for PSCell before reconfiguration.

4. Application in NR

The above-described PCell/PSCell MG configuration and MG overlapping issues may be equally applied to the general NR system environment in addition to the NTN system environment. That is, in a dual connectivity (DC) environment, MGs may be configured for each PCell and PSCell, and one or several MGs may be configured. The MG for the PSCell may be configured by the PCell (MCG). Alternatively, the PSCell (SCG) may configure the MG for PSCell directly. In order to support independent MG for PCell and PSCell, the UE may transmit, to the base station, the capability of whether the each MG configuration can be supported and how many MGs can be supported at the same time. Independent MGs may be configured. The UE may report to the base station after performing RRM measurement based on each configured MG. The base station may perform mobility management (e.g., HO command, PSCell addition/release) based on the result of the RRM measurement by the UE based on MG configuration.

5. MeasGapConfig Information Element

In the MeasGapConfig information element for independently configuring MG for PCell and MG for PSCell in DC, MeasGapConfig may be defined in various forms as follows. Table 11 shows gapPCell/gapPSCell.

TABLE 11

```
-- ASN1START
-- TAG-MEASGAPCONFIG-START
Meas GapConfig ::=          SEQUENCE {
gapFR2                      SetupRelease          OPTIONAL,   -- Need M
                            { GapConfig }

...,
[[
   gapFR1                   SetupRelease          OPTIONAL,   -- Need M
                            { GapConfig }
gapUE                       SetupRelease          OPTIONAL,   -- Need M
                            { GapConfig }
]]
gapPCell                    SetupRelease          OPTIONAL,   -- Need M
                            { GapConfig } gapPSCell                   SetupRelease          OPTIONAL,   -- Need M
                            { GapConfig }

}
GapConfig ::=               SEQUENCE {
gapOffset                   INTEGER (0..159),
mgl                         ENUMERATED
                            {ms1dot5, ms3, ms3dot5,
                            ms4, ms5dot5, ms6},
```

TABLE 11-continued

| mgrp | ENUMERATED {ms20, ms40, ms80, ms160}, | | |
|---|---|---|---|
| mgta | ENUMERATED {ms0, ms0dot25, ms0dot5}, | | |
| ..., [[ | | | |
| refServCellIndicator | ENUMERATED {pCell, pSCell, mcg-FR2} | OPTIONAL | -- Cond NEDCorNRDC |
| ]], [[ | | | |
| refFR2ServCellAsyncCA-r16 | ServCellIndex | OPTIONAL, | -- Cond AsyncCA |
| mgl-r16 | ENUMERATED {ms10, ms20} | OPTIONAL | -- Cond PRS |
| ]] } | | | |
| -- TAG-MEASGAPCONFIG-STOP | | | |
| -- ASN1STOP | | | |

Referring to Table 11, MeasGapConfig may include gapP-Cell and gapPSCell. The field gapPCell indicates a mea-surement gap for the PCell, and the field gapPSCell indicates a measurement gap for the PSCell. Table 12 shows gapFR2-PCell/gapFR1-PCell/gapUE-PCell/gapFR2-PSCell/gapFR1-PSCell/gapUE-PsCell.

TABLE 12

| -- ASN1START | | | |
|---|---|---|---|
| -- TAG-MEASGAPCONFIG-START | | | |
| Meas GapConfig ::= | SEQUENCE { | | |
| gapFR2 | SetupRelease { GapConfig } | OPTIONAL, | -- Need M |
| ..., [[ | | | |
| gapFR1 | SetupRelease { GapConfig } | OPTIONAL, | -- Need M |
| gapUE | SetupRelease { GapConfig } | OPTIONAL | -- Need M |
| ]] | | | |
| gapFR2-PCell | SetupRelease { GapConfig } | OPTIONAL | -- Need M |
| gapFR1-PCell | SetupRelease { GapConfig } | OPTIONAL | -- Need M |
| gapUE-PCell | SetupRelease { GapConfig } | OPTIONAL | -- Need M |
| gapFR2-PSCell | SetupRelease { GapConfig } | OPTIONAL | -- Need M |
| gapFR1-PSCell | SetupRelease { GapConfig } | OPTIONAL | -- Need M |
| gapUE-PSCell | SetupRelease { GapConfig } | OPTIONAL | -- Need M |
| } | | | |
| GapConfig ::= | SEQUENCE { | | |
| gapOffset | INTEGER (0..159), | | |
| mgl | ENUMERATED {ms1dot5, ms3, ms3dot5, ms4, ms5dot5, ms6}, | | |
| mgrp | ENUMERATED {ms20, ms40, ms80, ms160}, | | |
| mgta | ENUMERATED {ms0, ms0dot25, ms0dot5}, | | |
| ..., [[ | | | |
| refServCellIndicator | ENUMERATED {pCell, pSCell, mcg-FR2} | OPTIONAL | -- Cond NEDCorNRDC |
| ]], [[ | | | |
| refFR2ServCellAsyncCA-r16 | ServCellIndex | OPTIONAL, | -- Cond AsyncCA |
| mgl-r16 | ENUMERATED {ms10, ms20} | OPTIONAL | -- Cond PRS |
| ]] } | | | |
| -- TAG-MEASGAPCONFIG-STOP | | | |
| -- ASN1STOP | | | |

Referring to Table 12, MeasGapConfig may include gapFR2-PCell, gapFR1-PCell, gapUE-PCell, gapFR2-PS-Cell, gapFR1-PSCell and gapUE-PsCell. The field gapFR2-PCell, the field gapFR1-PCell and the field gapUE-PCell indicate measurement gap for PCell. The field gapFR2-PSCell, the field gapFR1-PSCell and the field gapUE-PSCell indicate measurement gap for PSCell. Table 13 shows MeasGapConfig-PSCell.

Figure 21:
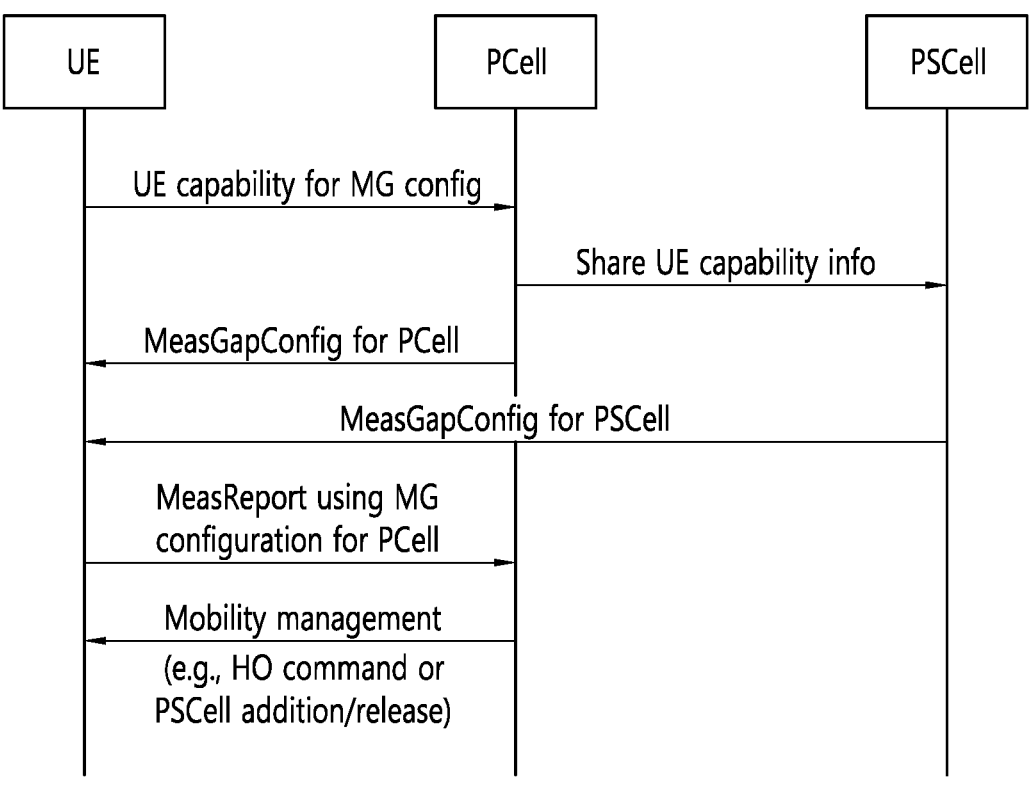
FIG. 21 shows Example of flowchart of MG configuration by each PCell and PSCell according to an embodiment of the present disclosure.

FIG. 21 Shows Example of Flowchart of MG Configuration by Each PCell and PSCell According to an Embodiment of the Present Disclosure.

UE may transmit UE capability for MG configuration to PCell.

PCell may transmit share UE capability info to PSCell.

PCell may transmit MeasGapConfig for PCell to UE.

PSCell may transmit MeasGapConfig for PSCell to UE.

TABLE 13

```
-- ASN1START
-- TAG-MEASGAPCONFIG-START
MeasGapConfig ::=          SEQUENCE
gapFR2                     SetupRelease          OPTIONAL,   -- Need M
                           { GapConfig }

...,
[[
gapFR1                     SetupRelease          OPTIONAL,   -- Need M
                           { GapConfig }
gapUE                      SetupRelease          OPTIONAL    -- Need M
                           { GapConfig }
]]
}
MeasGapConfig-PSCell ::=   SEQUENCE {
gapFR2                     SetupRelease          OPTIONAL,   -- Need M
                           { GapConfig }

...,
[[
gapFR1                     SetupRelease          OPTIONAL,   -- Need M
                           { GapConfig }
gapUE                      SetupRelease          OPTIONAL    -- Need M
                           { GapConfig }
]]
}
GapConfig ::=              SEQUENCE {
gapOffset                  INTEGER (0..159),
mgl                        ENUMERATED
                           {ms1dot5, ms3, ms3dot5,
                           ms4, ms5dot5, ms6},
mgrp                       ENUMERATED {ms20,
                           ms40, ms80, ms160},
mgta                       ENUMERATED {ms0,
                           ms0dot25, ms0dot5}, ...,
[[
refServCellIndicator       ENUMERATED {pCell,    OPTIONAL    -- Cond
                           pSCell, mcg-FR2}      NEDCorNRDC
]],
[[
refFR2ServCellAsyncCA-     ServCellIndex         OPTIONAL,   -- Cond
r16                                              AsyncCA
mgl-r16                    ENUMERATED {ms10,     OPTIONAL    -- Cond
                           ms20}                 PRS
]]
}
-- TAG-MEASGAPCONFIG-STOP
-- ASN1STOP
```

Referring to Table 13, MeasGapConfig may include MeasGapConfig-PSCell including gapFR2, gapFR1 and gapUE. The field gapFR2, the field gapFR1, the field gapUE indicate measurement gap for PSCell.

Figure 20:
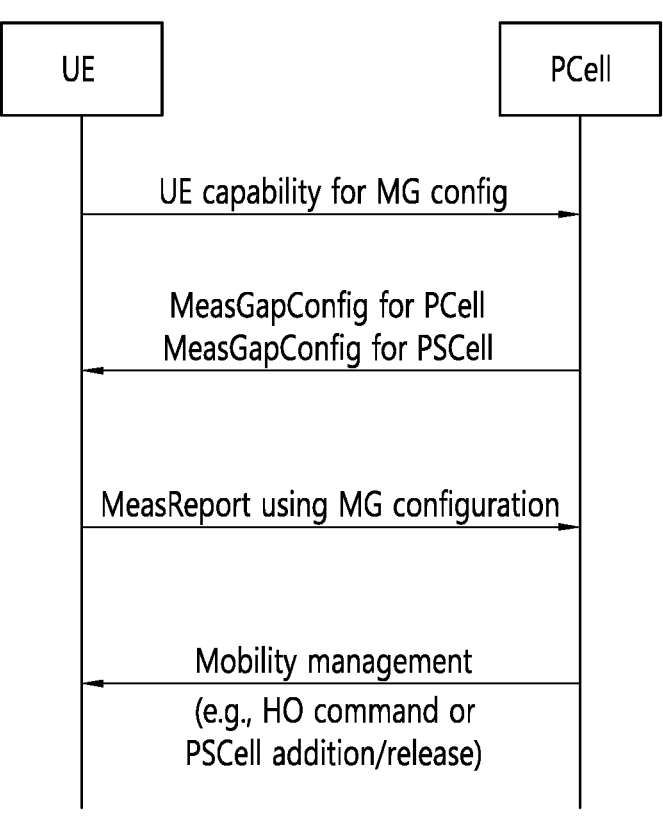
FIG. 20 shows Example of flowchart of MG configuration MG configuration by PCell according to an embodiment of the present disclosure.

FIG. 20 Shows Example of Flowchart of MG Configuration MG Configuration by PCell According to an Embodiment of the Present Disclosure.

UE may transmit UE capability for MG configuration to PCell.

PCell may transmit MeasGapConfig for PCell and MeasGapConfig for PSCell to UE.

UE may transmit MeasReport using MG configuration to PCell.

PCell may transmit Mobility management (e.g. HO command or PSCell addition/release) to UE.

UE may transmit MeasReport using MG configuration for PCell to PCell.

PCell may transmit Mobility management (e.g. HO command or PSCell addition/release) to UE.

FIG. 22 Shows a Procedure of UE According to an Embodiment of the Present Disclosure.

The UE may establish a dual connectivity (DC) with both a primary cell (PCell) and a primary secondary cell (PSCell).

The UE may determine i) a first propagation delay of a first NTN satellite for PSCell, ii) a second propagation delay of a second NTN satellite for target cell and iii) a third propagation delay of a third NTN satellite for PCell.

The UE may transmit, to PCell, timing offset for PSCell based on i) the first propagation delay, ii) the second propagation delay and iii) the third propagation delay:

The UE may receive, from the PCell, a first MG (measurement gap) for the PCell and a second MG for the PSCell.

The second MG configuration may be based on the timing offset.

The UE may perform measurement for the PCell in the first MG.

The UE may perform measurement for the PSCell in the second MG.

The UE may be connected with the PCell and PSCell by DC (dual connectivity)

The UE may transmit, to the PCell, indication indicating that the first MG and the second MG overlap, based on the first MG and the second MG overlapping.

The UE may receive, from the PCell, a first reconfigured RF retuning timing for measurement for the PCell and a second reconfigured RF retuning timing for measurement for the PSCell, The first reconfigured RF retuning timing may be same with the second reconfigured RF retuning timing in time domain, The UE may perform measurement for the PCell in the first MG based on the first reconfigured RF retuning timing:

The UE may perform measurement for the PSCell in the second MG based on the second reconfigured RF retuning timing.

The UE may receive, from the PCell, a reconfigured MG for both PCell and PSCell, The reconfigured MG may include the first MG and the second MG in time domain:

The UE may perform measurement for the PCell in the reconfigured MG:

The UE may perform measurement for the PSCell in the reconfigured MG.

FIG. 23 Shows a Procedure of Base Station According to an Embodiment of the Present Disclosure.

The base station may establish a dual connectivity (DC) for the UE between the PCell and a primary secondary cell (PSCell).

The base station may receive, from the UE, i) a first propagation delay of a first NTN satellite for PSCell, ii) a second propagation delay of a second NTN satellite for target cell and iii) a third propagation delay of a third NTN satellite for PCell:

The base station may determine a first MG (measurement gap) for the PCell and a second MG for the PSCell, based on i) the first propagation delay, ii) the second propagation delay and iii) the third propagation delay; and The base station may transmit, to the UE, the first MG and the second MG.

The base station may receive, from the UE, indication indicating that the first MG and the second MG overlap, based on the first MG and the second MG overlapping.

The base station may transmit, to the UE, a first reconfigured RF retuning timing for measurement for the PCell and a second reconfigured RF retuning timing for measurement for the PSCell, The first reconfigured RF retuning timing may be same with the second reconfigured RF retuning timing in time domain.

The base station may determine a reconfigured MG for both PCell and PSCell, based on the first MG and the second MG overlapping, The reconfigured MG may include the first MG and the second MG in time domain:

The base station may transmit, to the UE, the reconfigured MG for both PCell and PSCell.

Hereinafter, a device configured to operate in a wireless system, according to some embodiments of the present disclosure, will be described.

For example, a terminal may include a processor, a transceiver, and a memory.

For example, the processor may be configured to be coupled operably with the memory and the processor.

The processor may be configured to: establish a dual connectivity (DC) with both a primary cell (PCell) and a primary secondary cell (PSCell): determine i) a first propagation delay of a first non-terrestrial network (NTN) satellite for the PSCell, ii) a second propagation delay of a second NTN satellite for a target cell and iii) a third propagation delay of a third NTN satellite for the PCell: transmit, to PCell, a timing offset for PSCell based on i) the first propagation delay, ii) the second propagation delay and iii) the third propagation delay: receive, from the PCell, a first MG (measurement gap) for the PCell and a second MG for the PSCell, wherein the second MG configuration is based on the timing offset: perform measurement for the PCell in the first MG; and perform measurement for the PSCell in the second MG.

Hereinafter, an apparatus in a mobile communication, according to some embodiments of the present disclosure, will be described.

The processor may be configured to: establishing a dual connectivity (DC) with both a primary cell (PCell) and a primary secondary cell (PSCell): determining i) a first propagation delay of a first non-terrestrial network (NTN) satellite for the PSCell, ii) a second propagation delay of a second NTN satellite for a target cell and iii) a third propagation delay of a third NTN satellite for the PCell: transmitting, to PCell, a timing offset for the PSCell based on i) the first propagation delay, ii) the second propagation delay and iii) the third propagation delay: receiving, from the PCell, a first MG (measurement gap) for the PCell and a second MG for the PSCell, wherein the second MG configuration is based on the timing offset: performing measurement for the PCell in the first MG; and performing measurement for the PSCell in the second MG.

Hereinafter, a non-transitory computer-readable medium has stored thereon a plurality of instructions in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of UE.

The stored a plurality of instructions may cause the UE to establish a dual connectivity (DC) with both a primary cell (PCell) and a primary secondary cell (PSCell): determine i) a first propagation delay of a first non-terrestrial network (NTN) satellite for the PSCell, ii) a second propagation delay of a second NTN satellite for a target cell and iii) a third propagation delay of a third NTN satellite for the PCell: transmit, to PCell, a timing offset for the PSCell based on i) the first propagation delay, ii) the second propagation delay and iii) the third propagation delay: receive, from the PCell, a first MG (measurement gap) for the PCell and a second MG for the PSCell, wherein the second MG configuration is based on the timing offset: perform measurement for the PCell in the first MG; and perform measurement for the PSCell in the second MG.

The present disclosure can have various advantageous effects.

For example, by configuring MG based on propagation delay, measurement is performed more efficiently.

Advantageous effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method for radio communication, performed by a user equipment (UE), comprising:
   establishing a dual connectivity (DC) with both a primary cell (PCell) and a primary secondary cell (PSCell);
   determining i) a first propagation delay of a first non-terrestrial network (NTN) satellite for the PSCell, ii) a second propagation delay of a second NTN satellite for a target cell and iii) a third propagation delay of a third NTN satellite for the PCell;
   transmitting, to PCell, a timing offset for the PSCell based on i) the first propagation delay, ii) the second propagation delay and iii) the third propagation delay;

receiving, from the PCell, a first MG (measurement gap) for the PCell and a second MG for the PSCell,
   wherein the second MG is based on the timing offset;
   performing measurement for the PCell in the first MG; and
   performing measurement for the PSCell in the second MG.

2. The method of claim 1, further comprising:
   transmitting, to the PCell, indication indicating that the first MG and the second MG overlap, based on the first MG and the second MG overlapping.

3. The method of claim 2, further comprising:
   receiving, from the PCell, a first reconfigured RF retuning timing for measurement for the PCell and a second reconfigured RF retuning timing for measurement for the PSCell,
   wherein the first reconfigured RF retuning timing is same with the second reconfigured RF retuning timing in time domain,
   performing measurement for the PCell in the first MG based on the first reconfigured RF retuning timing;
   performing measurement for the PSCell in the second MG based on the second reconfigured RF retuning timing.

4. The method of claim 2, further comprising:
   receiving, from the PCell, a reconfigured MG for both the PCell and the PSCell,
   wherein the reconfigured MG includes the first MG and the second MG in time domain;
   performing measurement for the PCell in the reconfigured MG;
   performing measurement for the PSCell in the reconfigured MG.

5. A device configured to operate in a wireless system, the device comprising:
   a transceiver,
   a processor operably connectable to the transceiver,
   wherein the processer is configured to:
   establish a dual connectivity (DC) with both a primary cell (PCell) and a primary secondary cell (PSCell);
   determine i) a first propagation delay of a first non-terrestrial network (NTN) satellite for the PSCell, ii) a second propagation delay of a second NTN satellite for a target cell and iii) a third propagation delay of a third NTN satellite for the PCell;
   transmit, to PCell, a timing offset for the PSCell based on i) the first propagation delay, ii) the second propagation delay and iii) the third propagation delay;
   receive, from the PCell, a first MG (measurement gap) for the PCell and a second MG for the PSCell,
   wherein the second MG configuration is based on the timing offset;
   perform measurement for the PCell in the first MG; and
   perform measurement for the PSCell in the second MG.

6. The method of claim 5, further comprising:
   determining a reconfigured MG for both PCell and PSCell, based on the first MG and the second MG overlapping,
   wherein the reconfigured MG includes the first MG and the second MG in time domain;
   transmitting, to the UE, the reconfigured MG for both PCell and PSCell.

7. A method for serving a primary cell (PCell) for a user equipment (UE), performed by a base station, comprising:
   establishing a dual connectivity (DC) for the UE between the PCell and a primary secondary cell (PSCell);
   receiving, from the UE, i) a first propagation delay of a first non-terrestrial network (NTN) satellite for the PSCell, ii) a second propagation delay of a second NTN satellite for a target cell and iii) a third propagation delay of a third NTN satellite for the PCell;

determining a first MG (measurement gap) for the PCell and a second MG for the PSCell, based on i) the first propagation delay, ii) the second propagation delay and iii) the third propagation delay; and transmitting, to the UE, the first MG and the second MG.

8. The method of claim 7, further comprising:

receiving, from the UE, indication indicating that the first MG and the second MG overlap, based on the first MG and the second MG overlapping.

9. The method of claim 8, further comprising:

transmitting, to the UE, a first reconfigured RF retuning timing for measurement for the PCell and a second reconfigured RF retuning timing for measurement for the PSCell, wherein the first reconfigured RF retuning timing is same with the second reconfigured RF retuning timing in time domain.

* * * * *